(12) United States Patent
Ishizuka et al.

(10) Patent No.: US 9,813,660 B2
(45) Date of Patent: Nov. 7, 2017

(54) INFORMATION PROCESSING APPARATUS AND RECORDING APPARATUS SELECTION METHOD

(71) Applicant: SONY COMPUTER ENTERTAINMENT INC., Tokyo (JP)

(72) Inventors: Kensaku Ishizuka, Tokyo (JP); Yuki Kobayashi, Kanagawa (JP); Masakazu Hayashi, Tokyo (JP); Manabu Nishizawa, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 206 days.

(21) Appl. No.: 14/381,064

(22) PCT Filed: Apr. 1, 2013

(86) PCT No.: PCT/JP2013/002222
§ 371 (c)(1),
(2) Date: Aug. 26, 2014

(87) PCT Pub. No.: WO2013/153766
PCT Pub. Date: Oct. 17, 2013

(65) Prior Publication Data
US 2015/0002749 A1    Jan. 1, 2015

(30) Foreign Application Priority Data

Apr. 10, 2012  (JP) ................. 2012-089742

(51) Int. Cl.
*G06F 3/00* (2006.01)
*G06F 13/00* (2006.01)
(Continued)

(52) U.S. Cl.
CPC ............. *H04N 5/50* (2013.01); *H04N 5/4403* (2013.01); *H04N 5/782* (2013.01);
(Continued)

(58) Field of Classification Search
CPC .. H04N 5/4403; H04N 5/50; H04N 21/43622; H04N 21/47214; H04N 5/782;
(Continued)

(56) References Cited

U.S. PATENT DOCUMENTS

| 2005/0002638 | A1* | 1/2005 | Putterman | ................ H04N 5/76 386/213 |
| 2006/0035610 | A1* | 2/2006 | Potrebic | ................ H04H 40/18 455/178.1 |
| 2006/0093325 | A1* | 5/2006 | Imai | ...................... H04N 5/775 386/296 |
| 2007/0192796 | A1* | 8/2007 | Iwabuchi | ............. G11B 27/105 725/46 |
| 2008/0226258 | A1 | 9/2008 | Shikata et al. | |
| 2008/0256218 | A1 | 10/2008 | Kinoshita et al. | |

FOREIGN PATENT DOCUMENTS

JP      2006-155860 A      6/2006
JP      2008-28771 A       2/2008
(Continued)

OTHER PUBLICATIONS

International Search Report dated Jul. 2, 2013, from the corresponding PCT/JP2013/002222.
(Continued)

*Primary Examiner* — Nnenna Ekpo
(74) *Attorney, Agent, or Firm* — Katten Muchin Rosenman LLP

(57) ABSTRACT

An apparatus information acquisition unit 444 acquires information representative of a limitation relating to viewing or recording of a broadcasting program in regard to each of a plurality of recording apparatus. An operation detection unit 44 accepts a user operation which designates a recording target program. When the user operation is accepted, a recording apparatus selection unit 446 determines a priority of each recording apparatus in response to the limitation relating to viewing or recording of a broadcasting program in each recording apparatus, and selects a recording apparatus which has the highest priority as a recording apparatus which is to record the recording target program.

11 Claims, 23 Drawing Sheets

(51) Int. Cl.
- *H04N 5/445* (2011.01)
- *H04N 5/50* (2006.01)
- *H04N 21/442* (2011.01)
- *H04N 21/436* (2011.01)
- *H04N 5/782* (2006.01)
- *H04N 5/44* (2011.01)
- *H04N 21/4335* (2011.01)
- *H04N 21/458* (2011.01)
- *H04N 21/472* (2011.01)

(52) U.S. Cl.
CPC ... *H04N 21/4335* (2013.01); *H04N 21/43622* (2013.01); *H04N 21/442* (2013.01); *H04N 21/4583* (2013.01); *H04N 21/47214* (2013.01)

(58) Field of Classification Search
CPC .......... H04N 21/4335; H04N 21/4583; H04N 21/442
USPC ......... 725/38, 58, 59, 88, 102, 139; 348/731
See application file for complete search history.

(56) References Cited

FOREIGN PATENT DOCUMENTS

| | | |
|---|---|---|
| JP | 2008-85384 A | 4/2008 |
| JP | 2008-510367 A | 4/2008 |
| JP | 2008-205789 A | 9/2008 |
| JP | 2008-228104 A | 9/2008 |
| JP | 2008-278101 A | 11/2008 |
| JP | 2011-71669 A | 4/2011 |
| JP | 2012-39223 A | 2/2012 |
| WO | 2006/119593 | 11/2006 |

OTHER PUBLICATIONS

International Preliminary Report on Patentability dated Oct. 14, 2014, from the corresponding PCT/JP2013/002222.

\* cited by examiner

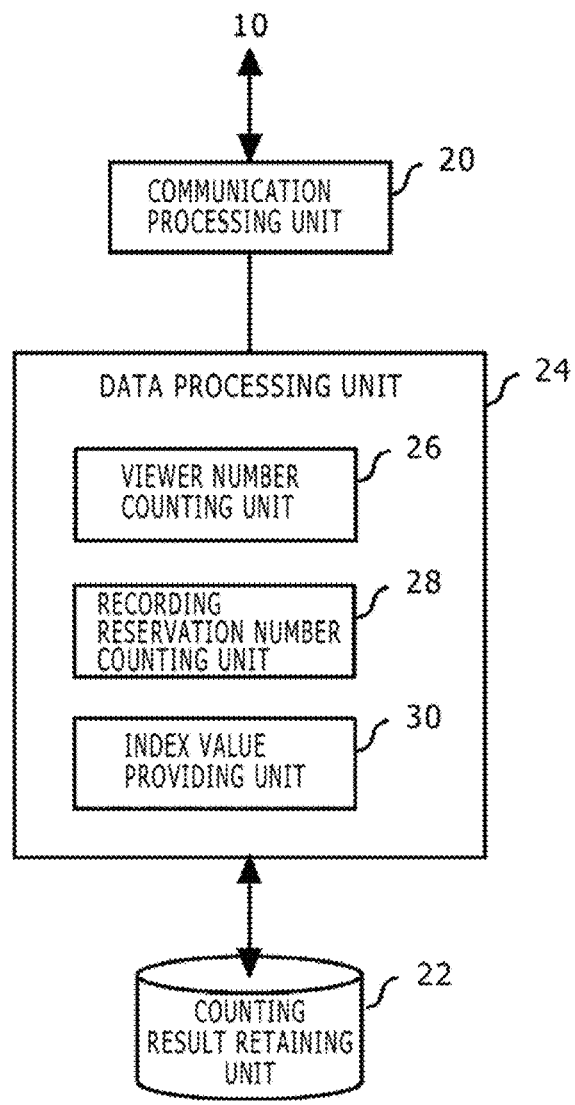

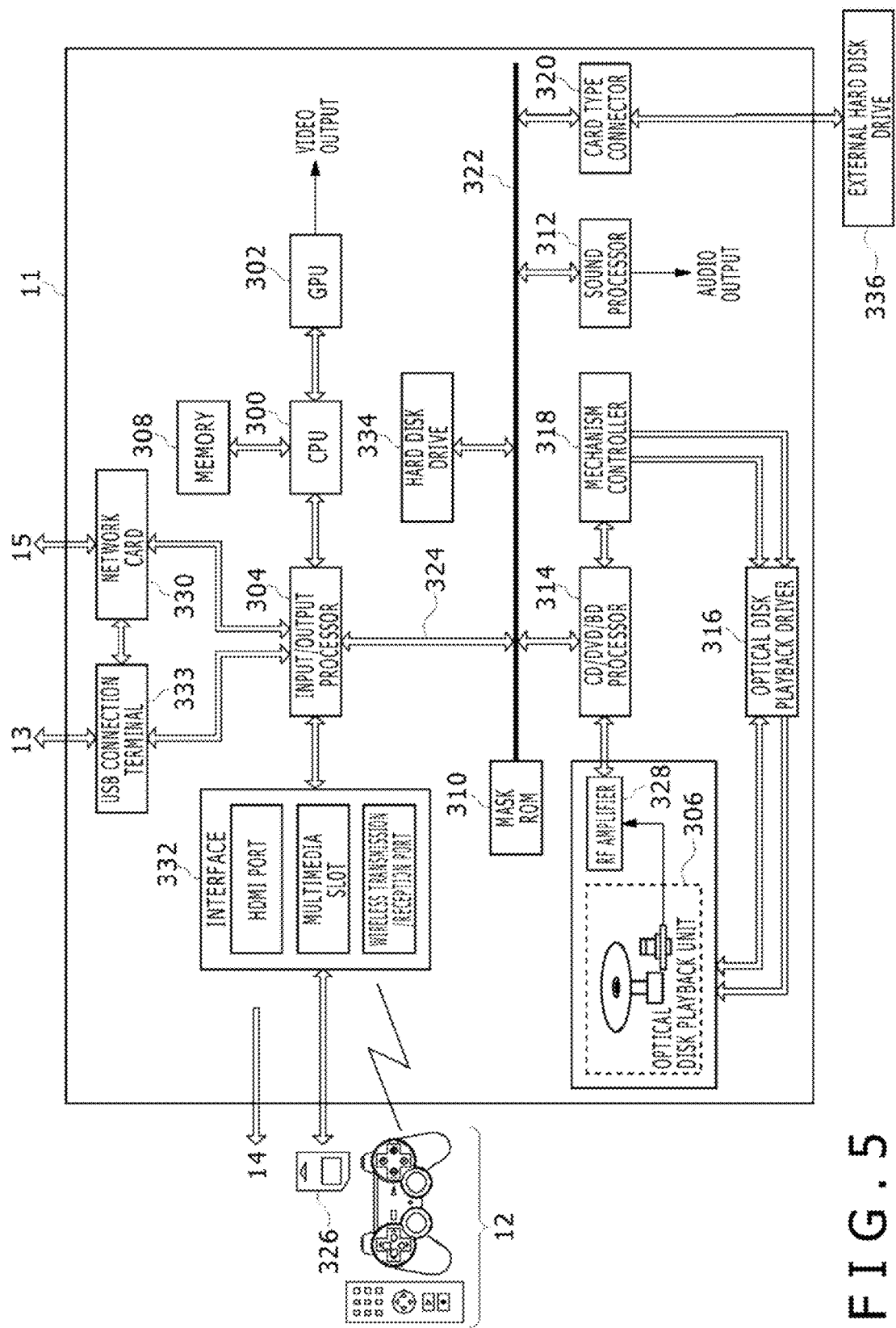
F I G. 5

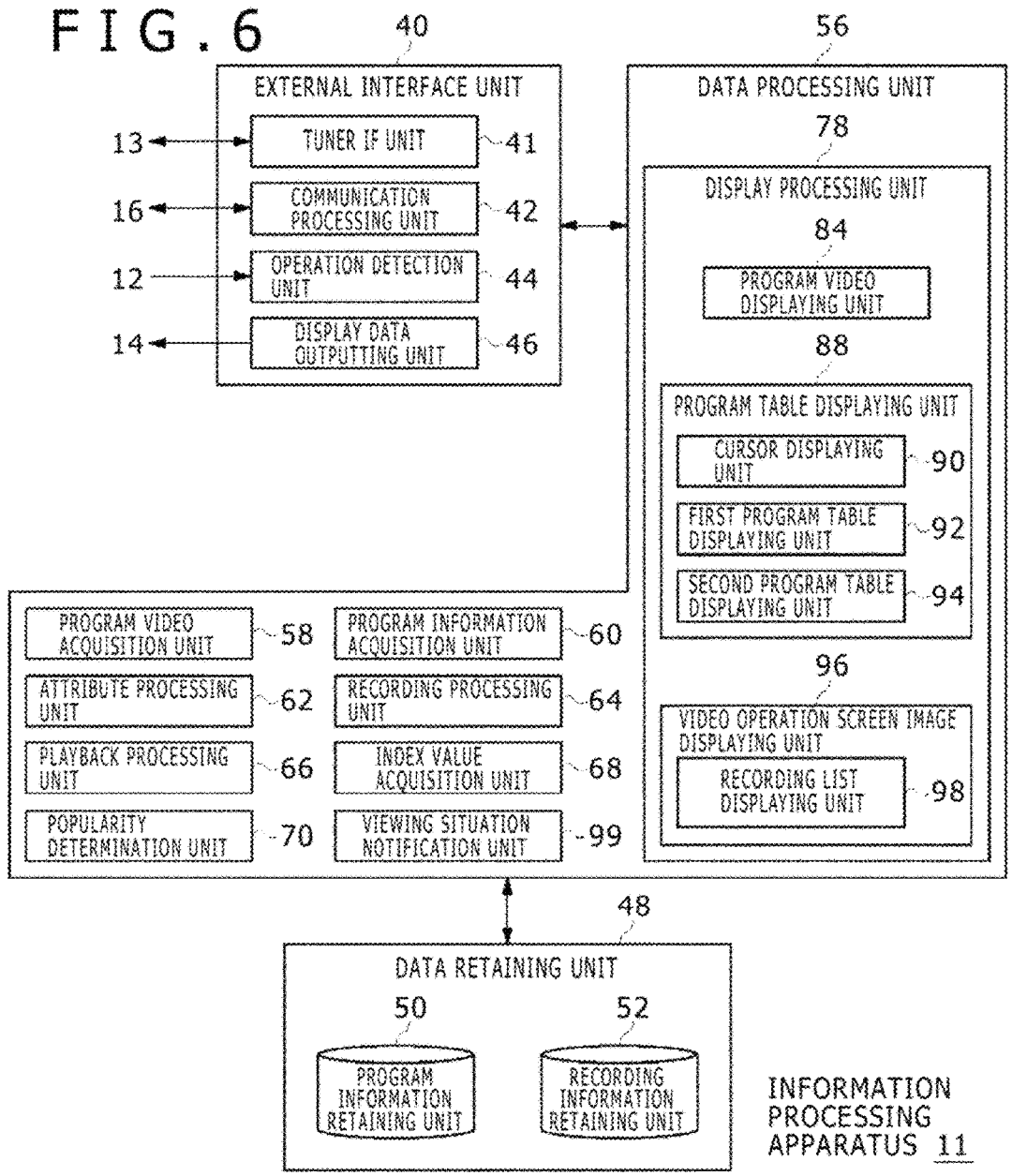

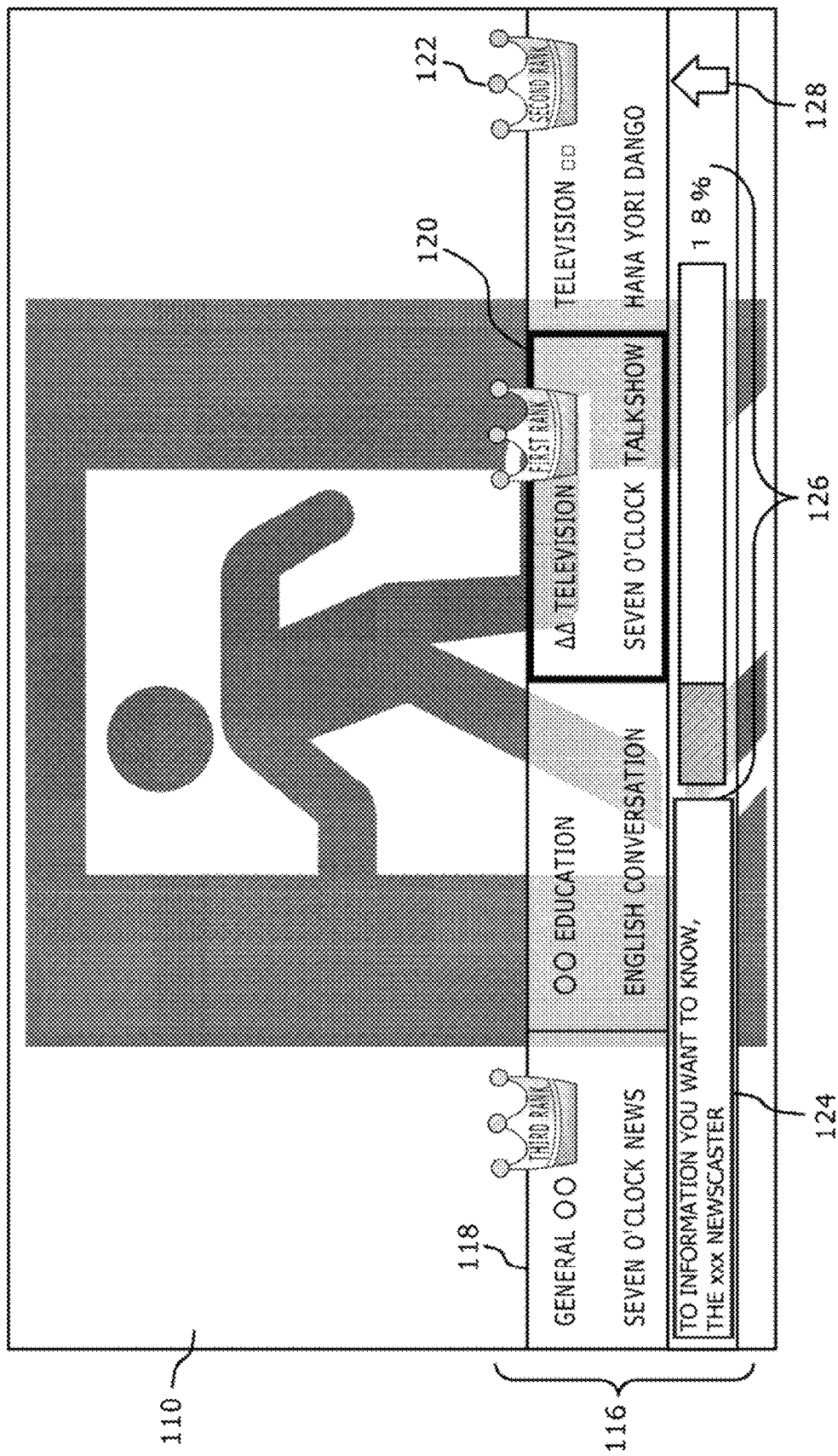

TABLE OF RECORDED CONTENTS

| PROGRAM TITLE | RECORDING DATE AND TIME | STATUS | PLAYBACK ADVANCE RATIO | |
|---|---|---|---|---|
| AAA | 2009/8/1 19:00 ~2009/8/1 20:58 | RECORDED | 100% | (PLAYBACK) |
| BBB | 2009/8/2 23:00 ~2009/8/2 24:55 | RECORDED | 40% | (PLAYBACK) |
| BBB | 2009/8/3 23:00 ~2009/8/3 24:55 | RECORDED | 0% | (PLAYBACK) |
| CCC | 2009/8/4 12:00 ~2009/8/4 12:52 | ERROR UPON RECORDING | — | |
| BBB | 2009/8/4 23:00 ~2009/8/4 24:55 | RESERVED | — | |
| ⋮ | ⋮ | ⋮ | ⋮ | |

| APPARATUS ID | INITIAL PRIORITY | RECEIVABLE CHANNEL | VIEWABLE CHANNEL (CONTRACTED CHANNEL) |
|---|---|---|---|
| LOCAL (DEDICATED TUNER 400) | 800 | TERRESTRIAL DIGITAL BROADCASTING: 1 ch | TERRESTRIAL DIGITAL BROADCASTING: 1 ch, 2ch, 4ch···(CHANNEL NUMBER: 7) |
| RECORDING APPARATUS 402a | 1000 | TERRESTRIAL DIGITAL BROADCASTING: 101ch···<br>BS BROADCASTING: 101ch···<br>CS BROADCASTING: 201ch··· | TERRESTRIAL DIGITAL BROADCASTING: 1 ch, 2ch, 4ch···(CHANNEL NUMBER: 7)<br>BS BROADCASTING: 101ch, 103ch, 141ch···(CHANNEL NUMBER: 10)<br>CS BROADCASTING: 321ch, 322ch, 323ch···(CHANNEL NUMBER: 40) |
| RECORDING APPARATUS 402b | 1000 | TERRESTRIAL DIGITAL BROADCASTING: 1 ch···<br>CS BROADCASTING: 201ch··· | TERRESTRIAL DIGITAL BROADCASTING: 1 ch, 2ch, 4ch···(CHANNEL NUMBER: 7)<br>CS BROADCASTING: 321ch, 322ch, 323ch···(CHANNEL NUMBER: 8) |

440

INFORMATION PROCESSING APPARATUS AND RECORDING APPARATUS SELECTION METHOD

TECHNICAL FIELD

The present invention relates to a data processing technology, and particularly to an information processing apparatus and a recording apparatus selection method.

BACKGROUND ART

In television broadcasting, multi-channeling over a plurality of broadcasting types such as terrestrial digital broadcasting, BS (Broadcasting Satellite) broadcasting, and CS (Communications Satellite) broadcasting has been implemented.

Meanwhile, PVRs (Personal Video Recorders) which record a broadcasted program video into a hard disk drive have been and are being used widely. Some PVRs in recent years are compatible with all of terrestrial broadcasting, BS broadcasting, and CS broadcasting, and a user can operate a user interface to record a favorite program.

SUMMARY

Technical Problem

A user sometimes selects one channel from among many channels to carry out program viewing and sometimes carries out program recording. When the user owns a plurality of tuners or recording apparatus, the user itself selects a tuner or a recording apparatus to be used for viewing or recording until now. This sometimes increases the burden on the user, and it is not always easy to appropriately select an apparatus to be used for viewing or recording of a program from among a plurality of apparatus.

Therefore, it is an object of the present invention to provide a technology which supports selection of an apparatus to be used for viewing or recording of a program.

Solution to Problem

In order to solve the subject described above, an information processing apparatus of a certain mode of the present invention includes an apparatus information acquisition unit which acquires information representative of a limitation relating to viewing or recording of a broadcasting program with regard to each of a plurality of recording apparatus, an acceptance unit which accepts a user operation for designating a recording target program, and a selection unit which determines, when the user operation is accepted, a priority of each of the recording apparatus in response to the limitation relating to viewing or recording of a broadcasting program by each of the recording apparatus and selects that one of the recording apparatus which has the highest priority as a recording apparatus which is to record the recording target program.

Another mode of the present invention is a recording apparatus selection method. The method is executed by an information processing apparatus and includes a step of acquiring information representative of a limitation relating to viewing or recording of a broadcasting program with regard to each of a plurality of recording apparatus, a step of accepting a user operation for designating a recording target program, and a step of determining, when the user operation is accepted, a priority of each of the recording apparatus in response to the limitation relating to viewing or recording of a broadcasting program by each of the recording apparatus and selecting that one of the recording apparatus which has the highest priority as a recording apparatus which is to record the recording target program.

It is to be noted that also an arbitrary combination of the components described above and the representations of the present invention by conversion between or among an apparatus, a method, a system, a program, a recording medium in or on which the program is stored and so forth are effective as modes of the present invention.

Advantageous Effect of Invention

With the present invention, it is possible to support selection of an apparatus for viewing or recording of a program.

BRIEF DESCRIPTION OF DRAWINGS

FIG. 3 is a block diagram depicting a functional configuration of an information management server of FIG. 1.

FIG. 4 is a view illustrating a structure of data retained in a counting result retaining unit.

FIG. 5 is a view of a hardware configuration of an information processing apparatus of FIG. 1.

FIG. 6 is a block diagram depicting a functional configuration of the information processing apparatus of FIG. 1.

FIG. 7 is a view illustrating a structure of data retained in a program information retaining unit.

FIG. 8 is a view illustrating a structure of data retained in a recording information retaining unit.

FIG. 9 is a view depicting a display image of a first program table.

FIG. 10 is a view depicting a display image of a second program table.

FIG. 12 is a view depicting an image of a video screen image on which a recording list is displayed.

FIG. 21 is a view illustrating apparatus information retained by an apparatus information retaining unit.

DESCRIPTION OF EMBODIMENTS (Base Technology)

Before an embodiment of the present invention is described, a base technology therefor is described. In the present base technology, an information processing technology for improving the amenity and/or the convenience to a user who views a program being broadcasted or a broadcasted program is proposed. The present information processing technology includes the following two technology components.

An outline of the first technology component is described. An electronic program table in the past merely presents outline information of programs determined by broadcasting stations and so forth, and the usability of the electronic program table has not necessarily been good to viewers. The base technology proposes a technology for providing an electronic program table superior in usability to viewers. For example, an electronic program table of a form of the base technology provides a user interface which is improved in usability when a viewer confirms program information.

An outline of the second technology component is described. At present, residences having a connection environment to the Internet are increasing, and it has become possible to carry out data transfer between a home information appliance owned by a viewer of a program and a server on the Internet. In the base technology, a technology for providing an electronic program table which presents not only a mere program outline but also information useful to viewers based on data exchange through the Internet. For example, in an electronic program table of a form of the base technology, a popularity ranking of a plurality of programs to be broadcasted in the same time zone is presented.

Figure 1:
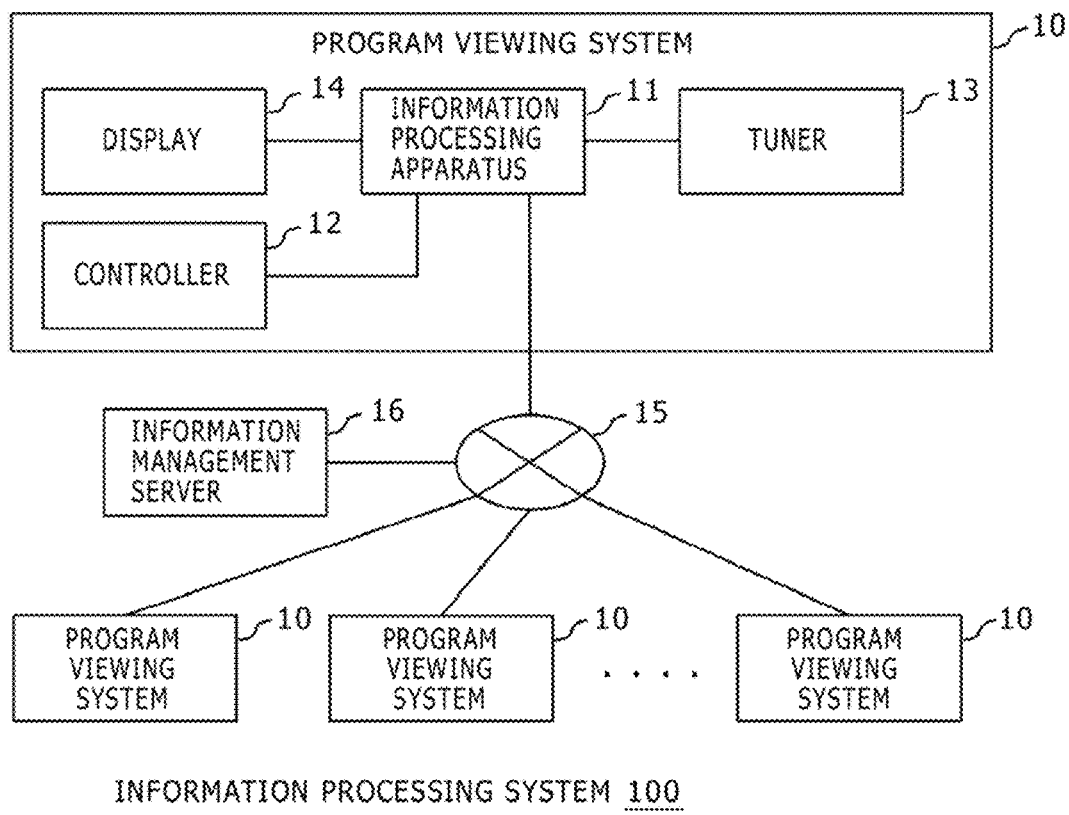
FIG. 1 is a view depicting a configuration of an information processing system of a form of a base technology.

FIG. 1 depicts a configuration of an information processing system of a form of the base technology. In an information processing system 100, a plurality of program viewing systems 10 and an information management server 16 are connected to each other through an Internet 15.

Each program viewing system 10 is a system which executes viewing, recording, and playback of a terrestrial digital television broadcast and displaying of a program table and includes an information processing apparatus 11, a controller 12, a tuner 13, and a display unit 14. In a form of the base technology, the program viewing system 10 makes a unit of a "viewer." Accordingly, a plurality of people who are viewing the display unit 14 are sometimes treated as a single viewer.

The tuner 13 is a terrestrial digital television tuner, and receives a broadcasting signal of a channel selected by the viewer and decodes the broadcasting signal into video information. Then, the tuner 13 sends the video information to the information processing apparatus 11. Meanwhile, the tuner 13 acquires EPG information, which is program information, from the broadcasting signal and sends the EPG information to the information processing apparatus 11. It is to be noted that the tuner 13 and the information processing apparatus 11 may be connected to each other by a USB (Universal Serial Bus) cable.

Figure 2:
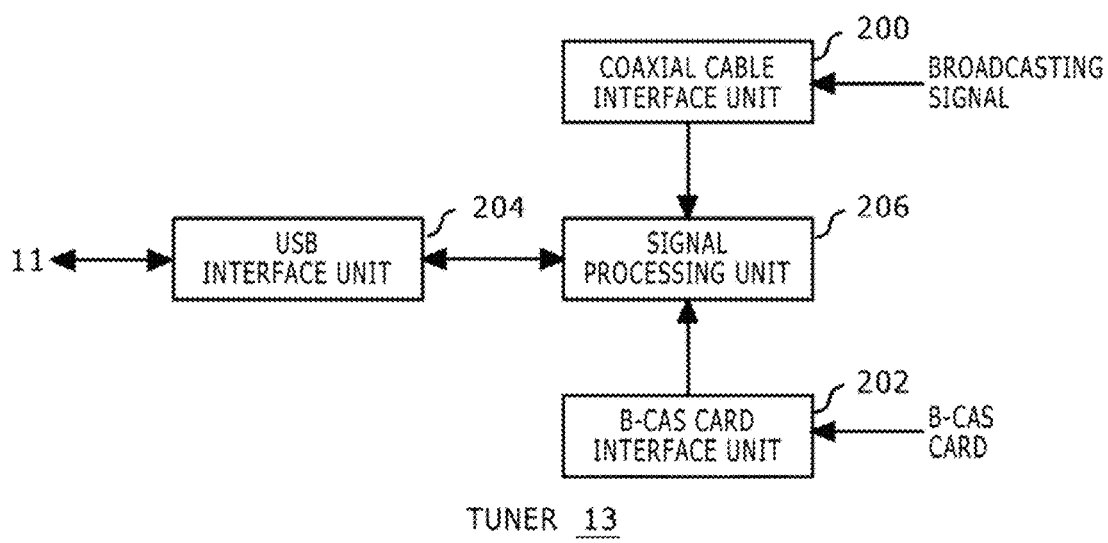
FIG. 2 is a block diagram depicting a functional configuration of a tuner of FIG. 1.

FIG. 2 is a block diagram depicting a functional configuration of the tuner 13 of FIG. 1. Blocks indicated in block diagrams of the present application can be implemented, in hardware, from elements beginning with a CPU and a memory of a computer and mechanical devices and implemented, in software, from a computer program or the like. Here, however, functional blocks implemented by cooperation of them are depicted. Accordingly, it is recognized by those skilled in the art that the functional blocks can be implemented in various forms by a combination of hardware and software.

The tuner 13 includes a coaxial cable interface unit 200, a B-CAS card interface unit 202, a USB interface unit 204, and a signal processing unit 206 ("B-CAS" is a registered trademark). The coaxial cable interface unit 200 provides an interface function with a coaxial cable connected to an antenna and acquires a broadcasting signal of a terrestrial digital television broadcast. The B-CAS card interface unit 202 provides an interface function with a B-CAS card and acquires an encryption key for decoding a broadcasting signal from the B-CAS card.

The USB interface unit 204 provides an interface function with a USB cable and acquires identification information of a channel selected by the viewer from the information processing apparatus 11. Further, the USB interface unit 204 sends video information of a selected channel or EPG information to the information processing apparatus 11. The signal processing unit 206 extracts a signal of a channel selected by the viewer from a broadcasting signal and decodes the signal into video information in accordance with the encryption key of the B-CAS card.

Referring back to FIG. 1, the information processing apparatus 11 is a computer terminal connected to the Internet 15, and accepts an operation of the viewer through the controller 12 and behaves in accordance with the operation. The information processing apparatus 11 may be a stationary game machine. In the information processing apparatus 11, a program viewing application (hereinafter referred to as "program viewing AP") is installed which causes the information processing apparatus 11 to display a live video of a program in a terrestrial digital television broadcast, record the live video, and play back the recorded video. Also a web browser for causing the information processing apparatus 11 to interpret and display data of a structured document described in HTML, XML or the like is installed in the information processing apparatus 11.

If the program viewing AP is started up in the information processing apparatus 11, then, for example, the information processing apparatus 11 acquires video information of a channel selected by the viewer from the tuner 13 and causes the display unit 14 to display a program video. Further, the information processing apparatus 11 acquires EPG information from the tuner 13 and causes the display unit 14 display an electronic program table. A detailed configuration of the information processing apparatus 11 is hereinafter described. It is to be noted that the information processing apparatus 11 and the display unit 14 may be connected to each other by an HDMI (registered trademark) (High-Definition Multimedia Interface) cable.

The information management server 16 manages viewing situations of programs acquired from the plural program viewing systems 10 and distributes the viewing situations to individual ones of the plural program viewing systems 10. A detailed configuration of the information management server 16 is hereinafter described.

FIG. 3 is a block diagram depicting a functional configuration of the information management server 16 of FIG. 1. It is recognized by those skilled in the art that, similarly as in FIG. 2, also functional blocks in FIG. 3 can be implemented in various forms by a combination of hardware and software. For example, the functional blocks of FIG. 3 may be stored as a computer program into a predetermined recording medium, installed into a hard disk of the information management server 16, suitably read out into a main memory of the information management server 16, and executed by a processor.

The information management server 16 includes a communication processing unit 20, a counting result retaining unit 22, and a data processing unit 24 which executes various data processes. The data processing unit 24 includes a viewer number counting unit 26, a recording reservation number counting unit 28, and an index value providing unit 30.

The communication processing unit 20 executes a communication process with an external apparatus through the Internet 15. The data processing unit 24 transmits and receives data to and from the information processing apparatus 11 of the program viewing system 10 through the communication processing unit 20. The counting result retaining unit 22 is a storage area for retaining result data of a counting process by the viewer number counting unit 26 and the recording reservation number counting unit 28 hereinafter described.

FIG. 4 illustrates a structure of data retained in the counting result retaining unit 22. In a program ID field, a program ID from which a program broadcasted in a specific date and time can be specified uniquely is set. This program ID indicates a different ID for a program of different broadcasting date and time even if programs of the same title are broadcasted periodically, and is determined in advance in EPG information. In a viewer number field, the total number of viewers who are viewing a program specified by the program ID is set. In a form of the base technology, programs are classified for each age group and for each sex, and the total number is set for each of the classes. In a recording reservation number field, total numbers for each age group and for each sex of viewers who have recording reservations of a program specified by the program ID are set.

Referring back to FIG. 3, the viewer number counting unit 26 periodically acquires a program ID of a program being viewed at present by a viewer from each of a plurality of information processing apparatus 11 and counts the program IDs. In one form of the base technology, the viewer number counting unit 26 acquires an attribute of a viewer (namely an age group and a sex) together with the program ID, counts the number of viewers of the program specified by the program ID for each of the attributes of the viewers and stores the counted viewer numbers into the counting result retaining unit 22.

The recording reservation number counting unit 28 periodically acquires a program ID of a program reserved for recording by a viewer from each of the plural information processing apparatus 11 and counts the number of the program IDs. In one form of the base technology, the recording reservation number counting unit 28 acquires an attribute of a viewer together with a program ID, counts the recording reservation number of the program specified by the program ID for each viewer attribute and stores the counted recording reservation numbers into the counting result retaining unit 22.

The index value providing unit 30 provides an index value indicative of a viewing situation of a program in the information processing system 100 to the information processing apparatus 11. This index value includes an index value (hereinafter referred to also as "live index value") indicative of whether the number viewers who are viewing the program is great or small and an index value (hereinafter referred to also as "reservation index value") indicative of whether the number of viewers who have a reservation for recording of the program is great or small.

In particular, the index value providing unit 30 transmits, as the live index value, the number of viewers for each age group and for each sex retained in the counting result retaining unit 22 to the information processing apparatus 11. Further, as the reservation index value, the index value providing unit 30 transmits the number of recording reservations for each age group and for each sex retained in the counting result retaining unit 22 to the information processing apparatus 11.

As a modification, the index value providing unit 30 may provide, in place of the viewer number itself, a result when a viewer number is inputted to a predetermined evaluation function as the live index value. For example, the viewer number of a certain program occupied in the overall viewer number, namely, a viewer rating, may be provided. It is similar about the reservation index value. For example, the recording reservation number of a certain program occupied in the overall viewer number, namely, a recording reservation ratio, may be provided as the reservation index value.

FIG. 5 is a view of a hardware configuration of the information processing apparatus 11 of FIG. 1. The information processing apparatus 11 includes a CPU 300, a GPU (Graphic Processor Unit) 302, an input/output processor 304, an optical disk playback unit 306, a main memory 308, a mask ROM 310, and a sound processor 312 as basic components.

The CPU 300 controls signal processing and internal components based on various programs of a game, an electronic mail, an application for a Web browser and so forth. The CPU 300 may be a multicore CPU such as a CELL or may be a heterogeneous multicore CPU configured from a combination of a plurality of processor cores of different types.

The GPU 302 executes an image process. The input/output processor 304 executes an interface process between the outside and the inside of the apparatus and a process for keeping backward compatibility. The optical disk playback unit 306 plays back an optical disk such as a BD, a DVD, or a CD on which an application program or multimedia data is recorded. The main memory 308 functions as a work area of the CPU 300 or a buffer for temporarily storing data read out from an optical disk. The mask ROM 310 stores therein an operating system program which is executed principally by the CPU 300 or the input/output processor 304. The sound processor 312 processes an audio signal.

Further, the information processing apparatus 11 has also a CD/DVD/BD processor 314, an optical disk playback driver 316, a mechanism controller 318, a hard disk driver 334, and a card type connector (for example, a PC card slot) 320. The CD/DVD/BD processor 314 carries out, for example, an error correction process, a decompression decoding process and so forth for a disk playback signal read out from a CD/DVD/BD by the optical disk playback unit 306 and amplified by a RF amplifier 328 to reproduce (restore) the data recorded on the CD/DVD/BD. The optical disk playback driver 316 and the mechanism controller 318 execute rotation control of a spindle motor, focusing/tracking control of an optical pickup, loading control of a disk tray and so forth of the optical disk playback unit 306.

Further, the hard disk driver 334 stores save data of an application program or a game read out, for example, by the optical disk playback unit 306 or stores data of photographs, moving pictures, music and so forth acquired through the input/output processor 304. The card type connector 320 is a connection port, for example, for a communication card, an external hard disk driver 336 or the like. The components mentioned are connected to each other principally by bus lines 322, 324 and so forth.

The CPU 300 executes an operating system program for a CPU stored in the mask ROM 310 to control overall behavior of the information processing apparatus 11. Further, the CPU 300 is read out from an optical disk such as a CD, a DVD, or a BD and loaded into the main memory 308. Further, the CPU 300 executes various application programs and so forth downloaded through a communication network to control a behavior such as creation or editing of a game or an electronic mail or browsing of a Web page.

The input/output processor 304 executes an operating system program for an input/output processor stored in the mask ROM 310 to control setting of a signal or a game from the controller 12 in response to an operation of the user, inputting and outputting of data to or from a memory card 326 which stores the substance or an address of an electronic mail, a URL and so forth of a Web site.

Further, the input/output processor 304 controls also inputting and outputting of data through a USB connection terminal 333, a network card 330, an IEEE1394 terminal or a PC card slot not depicted and so forth. For example, the input/output processor 304 is connected to the tuner 13 through the USB connection terminal 333 and connected to the Internet 15 through the network card 330. Further, the input/output processor 304 carries out inputting and outputting of data to and from the memory card 326 through a PC card slot not depicted. Information from the controller 12 or the memory card is transferred through an interface 332 including a multimedia slot or a wireless transmission/reception port.

Further, the wireless transmission/reception port communicates with a game controller or a BD-DVD operating controller through a wireless LAN, the Bluetooth (registered trademark) or the like. Further, the interface 332 has also an interface with an HDMI (registered trademark) cable and outputs video data to the display unit 14 through the interface.

The GPU 302 has a function of a geometry transfer engine which carries out such a process as coordinate transformation and a function as a rendering processor, and renders in accordance with a rendering instruction from the CPU 300 and stores the rendered image into a frame buffer not depicted. Then, the GPU 302 outputs a video signal corresponding to the generated image. The sound processor 312 includes an ADPCM (Adaptive Differential Pulse Code Modulation) demodulation function, an audio signal reproduction function, a signal conversion function and so forth.

For example, if power supply is made available to the information processing apparatus 11 having such a configuration as described above, then operating system programs for the CPU 300 and the input/output processor 304 are read out from the mask ROM 310. The CPU 300 and the input/output processor 304 individually execute the corresponding operating system programs. Consequently, the CPU 300 comprehensively controls the components of the information processing apparatus 11. Meanwhile, the input/output processor 304 controls inputting and outputting of signals between the controller 12 and the memory card 326 and so forth.

Further, when the CPU 300 executes the operating system program, it first carries out an initialization process such as a behavior verification. Then, the CPU 300 controls the optical disk playback unit 306 to read out an application program for a game or the like recorded on an optical disk, loads the game application program into the main memory 308, and then executes the game application program. By the execution of the game application program, the CPU 300 controls the GPU 302 and the sound processor 312 in response to an instruction of the user accepted from the controller 12 through the input/output processor 304 to control display of an image and generation of effect sound or music sound.

FIG. 6 is a block diagram depicting a functional configuration of the information processing apparatus 11 of FIG. 1. It is recognized by those skilled in the art that also the functional blocks of FIG. 6 can be implemented in various forms from a combination of hardware and software similarly as in FIG. 2. For example, the functional blocks of FIG. 6 may be stored in a predetermined recording medium as a computer program and installed into the hard disk driver 334 of FIG. 5, read out suitably into the main memory 308 of the information processing apparatus 11, and executed by the CPU 300. In other words, also it can be said that the functional blocks of FIG. 6 indicate various modules which configure the program viewing AP.

The information processing apparatus 11 includes an external interface unit 40, a data retaining unit 48, and a data processing unit 56. The external interface unit 40 provides an interface function with various external apparatus, and the data processing unit 56 sends and receives data to and from an external apparatus through the external interface unit 40. The external interface unit 40 includes a tuner IF unit 41, a communication processing unit 42, an operation detection unit 44, and a display data outputting unit 46.

The tuner IF unit 41 provides an interface function with the tuner 13 and sends data accepted from the tuner 13 to the data processing unit 56. The communication processing unit 42 executes a communication process with the information management server 16 through the Internet 15. The operation detection unit 44 detects an operation of the viewer for the controller 12 and sends the substance of the operation to the data processing unit 56. The display data outputting unit 46 sends video or image data for display sent from a display processing unit 78 hereinafter described to the display unit 14 so as to be displayed on the display unit 14.

The data retaining unit 48 is a storage area for retaining various data and may be incorporated as a hard disk drive and storage data of the hard disk drive. The data retaining unit 48 includes a program information retaining unit 50 and a recording information retaining unit 52.

The program information retaining unit 50 retains program information of a plurality of programs to be displayed on an electronic program table. FIG. 7 illustrates a structure of data retained in the program information retaining unit 50. In a program outline field, outline information of the program is set. In a popularity ranking field, a relative popularity ranking of a plurality of programs broadcasted in the same time zone is temporarily set.

Referring back to FIG. 6, the recording information retaining unit 52 retains recording information which is information relating to program recording by the information processing apparatus 11. FIG. 8 illustrates a structure of data retained in the recording information retaining unit 52. In a recording ID field, a recording ID with which a recording content can be specified uniquely by the information processing apparatus 11 is set.

In a recording flag field in FIG. 8, flags representative of whether or not a recording process has been executed already and whether or not an error has occurred in the recording process are set. For example, a record in which the recording flag field represents "executed" indicates a state after recording, but another record in which the recording flag field is "not executed" indicates a recording reservation state. In a playback advance ratio field, a playback advancing situation of the recording content, namely, a value representative of by what percent the recording content has been recorded, is set. For example, a record whose playback advance ratio is "0%" indicates that playback of the recording content has not been executed at all. In a content data field, data of the recorded content itself, namely, data of recorded program videos and audios, subtitles and so forth can be set.

It is to be noted that the physical storage area in which the data retaining unit 48 retains various data may be the hard disk driver 334 built in the information processing apparatus 11, may be the external hard disk driver 336 or may be the memory card 326. Alternatively, only recording information (particularly data in the content data field) whose data size is generally great may be retained in the external hard disk driver 336. Data to be recorded and a storage area in which the data is to be recorded may be determined as needed by an operation of the viewer.

The data processing unit 56 is a functional block which executes various data processes and may be incorporated as a module of a computer program. The data processing unit 56 includes a program video acquisition unit 58, a program information acquisition unit 60, an attribute acquisition unit 62, a recording processing unit 64, a playback processing unit 66, an index value acquisition unit 68, a popularity determination unit 70, a display processing unit 78, and a viewing situation notification unit 99.

The program video acquisition unit 58 acquires video information of a program sent from the tuner 13. The program information acquisition unit 60 acquires EPG information sent from the tuner 13 and stores program information of programs into the program information retaining unit 50.

The attribute acquisition unit 62 acquires attribute information of the viewer itself inputted by the viewer, for example, an age and a sex of the viewer. For example, the attribute acquisition unit 62 may acquire such attribute information from a predetermined storage area in which attribute information inputted to a setting screen image of the information processing apparatus 11 by the viewer is retained.

The recording processing unit 64 executes a recording reservation process and a recording process of a program designated by the viewer and suitably updates recording information of the recording information retaining unit 52. For example, in the recording reservation process, the recording flag is set to "not executed." In the recording process, if it is detected that recording start time recorded in the recording information retaining unit 52 comes, then the recording processing unit 64 transmits a channel instruction designating a channel of a recording target program to the tuner 13. Then, the recording processing unit 64 accepts video and audio data of the recording target program transmitted from the tuner 13 through the program video acquisition unit 58 and successively records the video and audio data into the content data field. Further, if the recording process ends normally, then the recording processing unit 64 sets the recording flag to "executed" and sets, if an error occurs in the recording process, the recording flag to "error occurred."

The playback processing unit 66 sends video data of a recording content designated by the viewer to the display processing unit 78 to execute a playback process of the video data. Together with this, the playback processing unit 66 suitably updates the recording information of the recording information retaining unit 52 in response to a playback situation of the recording content. For example, the playback processing unit 66 sets a ratio of the playback time occupying in the recording time to the playback advance ratio field.

The index value acquisition unit 68 acquires a live index value and a reservation index value from the information management server 16. In particular, the index value acquisition unit 68 acquires a live index value and a reservation index value when a displaying process of an electronic program table is started by the display processing unit 78. Further, if the index value acquisition unit 68 detects lapse of an interval period determined in advance, then it newly acquires the latest live index value and reservation index value.

The popularity determination unit 70 determines a relative popularity ranking of a plurality of programs broadcasted in the same time zone in accordance with the live index value and/or the reservation index value. In one form of the base technology, as the total value of the live index value and the reservation index value becomes higher, a higher ranking is provided to the program. It is to be noted that, since the live index value is not obtained with regard to a program before it is broadcasted, the popularity ranking is determined only in accordance with the reservation index value. After a popularity ranking of the programs is determined, the popularity determination unit 70 updates the data of the popularity ranking field in the program information of the program information retaining unit 50.

If a population for which a popularity ranking is to be determined is designated in advance by the user, then the popularity determination unit 70 determines the popularity ranking in accordance with the live index value and reservation index value associated with a designated attribute or attributes (here, the age group and the sex). If no population is designated, then the popularity determination unit 70 determines the popularity ranking in accordance with the sum value of the live index values of all attributes and the sum value of the reservation index values of all attributes.

It is to be noted that the popularity determination unit 70 may output the index values themselves acquired by the index value acquisition unit 68 as data representative of the degrees of popularity without determining the popularity ranking. In this instance, the index values themselves are treated similarly to the popularity rankings.

The display processing unit 78 sends data of a moving picture or a still picture to be displayed on the display unit 14 to the display data outputting unit 46 so that an image desired by the viewer is displayed on the display unit 14. The display processing unit 78 includes a program video displaying unit 84, a program table displaying unit 88, and a video operation screen image displaying unit 96.

Referring back to FIG. 6, the program video displaying unit 84 causes the display unit 14 to display a video of a program. For example, when a user operation indicating displaying of a program video being broadcasted is accepted, the program video displaying unit 84 causes the display unit 14 to display a live video of a program acquired by the program video acquisition unit 58. Further, when a request for playback of a recording content is inputted on a video screen image, the program video displaying unit 84 causes the display unit 14 to display a video of the recording content accepted from the playback processing unit 66.

Further, the program video displaying unit 84 causes a television screen image or a video screen image (hereinafter referred to also as "video display screen image" collectively) in which a video of a program is displayed to display an operation icon for accepting an operation from the viewer.

Referring back to FIG. 6, the program table displaying unit 88 executes a displaying process of an electronic program table. The program table displaying unit 88 includes a cursor displaying unit 90, a first program table displaying unit 92, and a second program table displaying unit 94. The cursor displaying unit 90 causes the display unit 14 to display a cursor for allowing the viewer to select a particular program on an electronic program table and causes the cursor to move in response to an operation of the viewer. The viewer would operate the controller 12 to move the cursor to select a region (hereinafter referred to as "program frame") in which information of one program is displayed in the electronic program table. This program frame can be said also as a cell region formed from a time axis and a channel axis.

The first program table displaying unit 92 refers, when a predetermined operation is accepted during display of a program video by the program video displaying unit 84, to program information of the program information retaining unit 50 to cause a first program table to be displayed in an overlapping relationship with the program video. This first program is a program table in which program information of a plurality of programs being broadcasted at present through a plurality of channels is disposed. The first program table displaying unit 92 sets a predetermined transmission factor so that the viewer can visually recognize a program video of the background and causes the first program table to be displayed.

In one form of the base technology, the first program table displaying unit 92 causes the first program table, in which information of programs being broadcasted at present is disposed, to be displayed. If a program displayed in a certain program frame ends, then the first program table displaying unit 92 causes information of a program, which is to be broadcasted next, to be displayed in the program frame.

FIG. 9 depicts a display image of a first program table 116. In the first program table 116, a program frame 118 corresponding to each of a plurality of channels is displayed, and a channel name and a program title are displayed in each program frame 118. The first program table displaying unit 92 refers to program information of the programs to cause objects representative of popularity rankings (each hereinafter referred to also as "popularity ranking indicator") to be displayed in an associated relationship with the program frames 118 of the three programs having comparatively popularity rankings. As a modification, the popularity ranking of each program may be suggested to the viewer by making the colors in the program frames 118 different from each other or by making the character fonts or the like of the program information different from each other. It is to be noted that the first program table displaying unit 92 periodically (for example, after every one minute) refers to the program information of the programs to update the display of the popularity ranking indicators.

The cursor displaying unit 90 causes a cursor 120 for selecting the program frame 118 to be displayed, and the viewer would select the program frame 118 of a program, whose substance, advance situation and so forth the viewer wants to confirm, by the cursor 120. The first program table displaying unit 92 acquires a program outline of the program corresponding to the program frame 118 selected by the cursor 120 (such a program is hereinafter referred to also as "provisionally selected program") from the program information retaining unit 50 and causes the program outline to be displayed through scrolling in a program outline field 124. It is to be noted that, when the cursor 120 is moved in a downward direction in a certain program frame 118, the first program table displaying unit 92 may cause information of a program, which is to be broadcasted next to the program being broadcasted at present, to be displayed in the program frame 118.

Further, the first program table displaying unit 92 calculates an advance degree of a provisionally selected program based on broadcasting start time and broadcasting end time of the provisionally selected program and the current time and causes the calculated advance degree to be displayed in an advance degree indicator 126. As a modification, the displaying form of each of the plural program frames 118 displayed in the first program table 116 may be made different in response to the advance degree of the program to suggest the advance degree of the programs to the viewer.

Further, the first program table displaying unit 92 causes a popularity transition indicator 128 of the provisionally selected program to be displayed. When the first program table displaying unit 92 acquires the latest popularity ranking of the provisionally selected program, it sets the popularity transition indicator 128 so as to indicate a transition situation (for example, one of rising, falling, and no change) when compared with the popularity ranking till then.

If the viewer executes a predetermined viewing operation (to depress a particular button of the controller 12 or the like) for the provisionally selected program in the first program table 116, then the data processing unit 56 detects that the provisionally selected program is designated as finally selected program. At this time, the program video displaying unit 84 changes over the program video to be displayed in a video displaying screen image 110 to a video of the finally selected program. For example, the program video acquisition unit 58 acquires video information of the finally selected program from the tuner 13, and the program video displaying unit 84 causes the display unit 14 to display a program video of the finally selected program.

Figure 13:
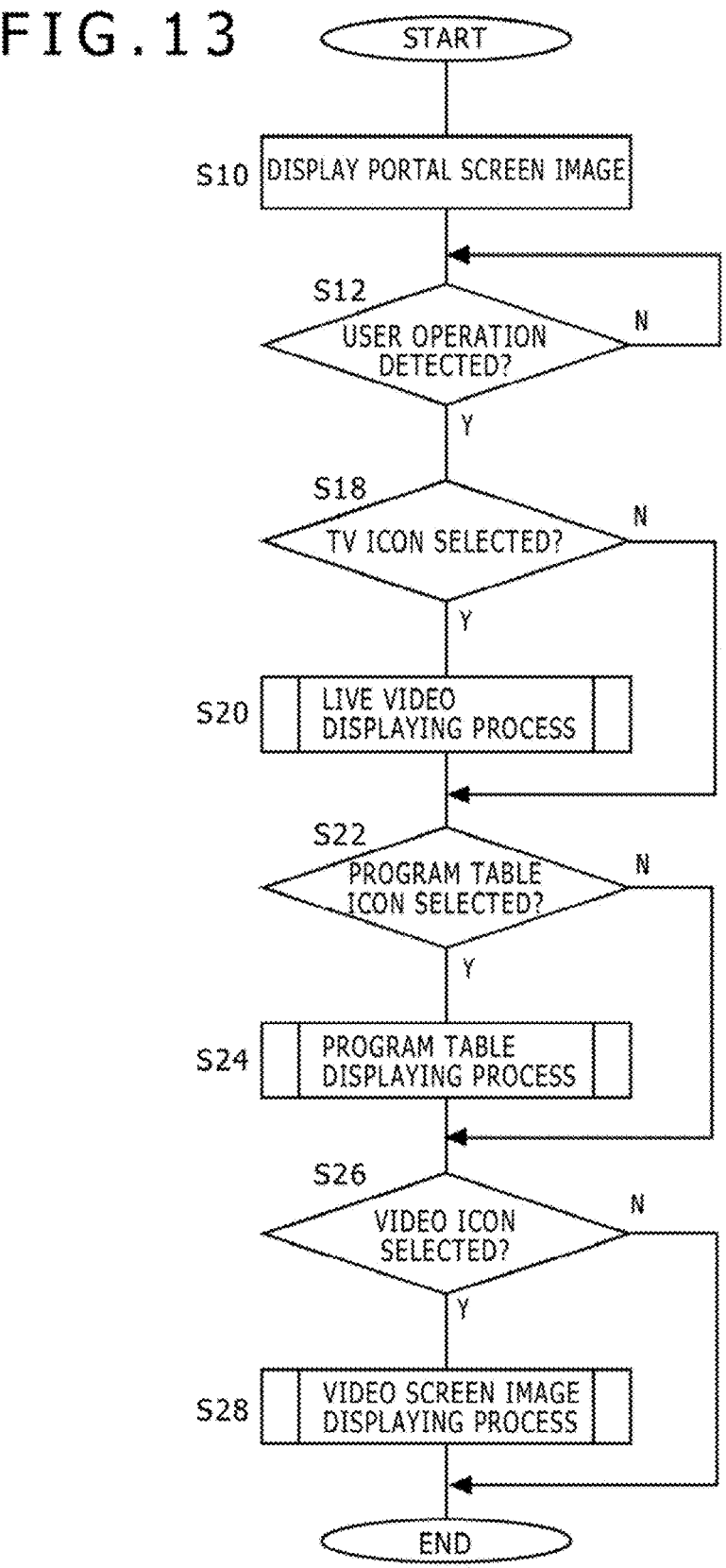
FIG. 13 is a flow chart illustrating a behavior of the information processing apparatus.

It is to be noted that, though not depicted in FIG. 13, the first program table displaying unit 92 may further cause a live index value and/or a reservation index value, on which the popularity ranking at present is based, to be displayed further in an associated relationship with a program whose popularity ranking indicator is displayed, the provisionally selected program or a like program. With the present form, in addition to a popularity ranking by which a viewing situation of a program is abstracted, data itself indicative of an actual situation of the viewing situation can be confirmed by the viewer.

Referring back to FIG. 6, if a user operation which indicates displaying of a program table is detected, then the second program table displaying unit 94 causes a second program table to be displayed in an overall area of the screen image of the display unit 14. The second program table is an electronic program table in which the axis of ordinate represents the time axis over a plurality of time zones and the axis of abscissa represents the channel axis over a plurality of channels and in which program information of a plurality of programs is disposed.

Figure 10:
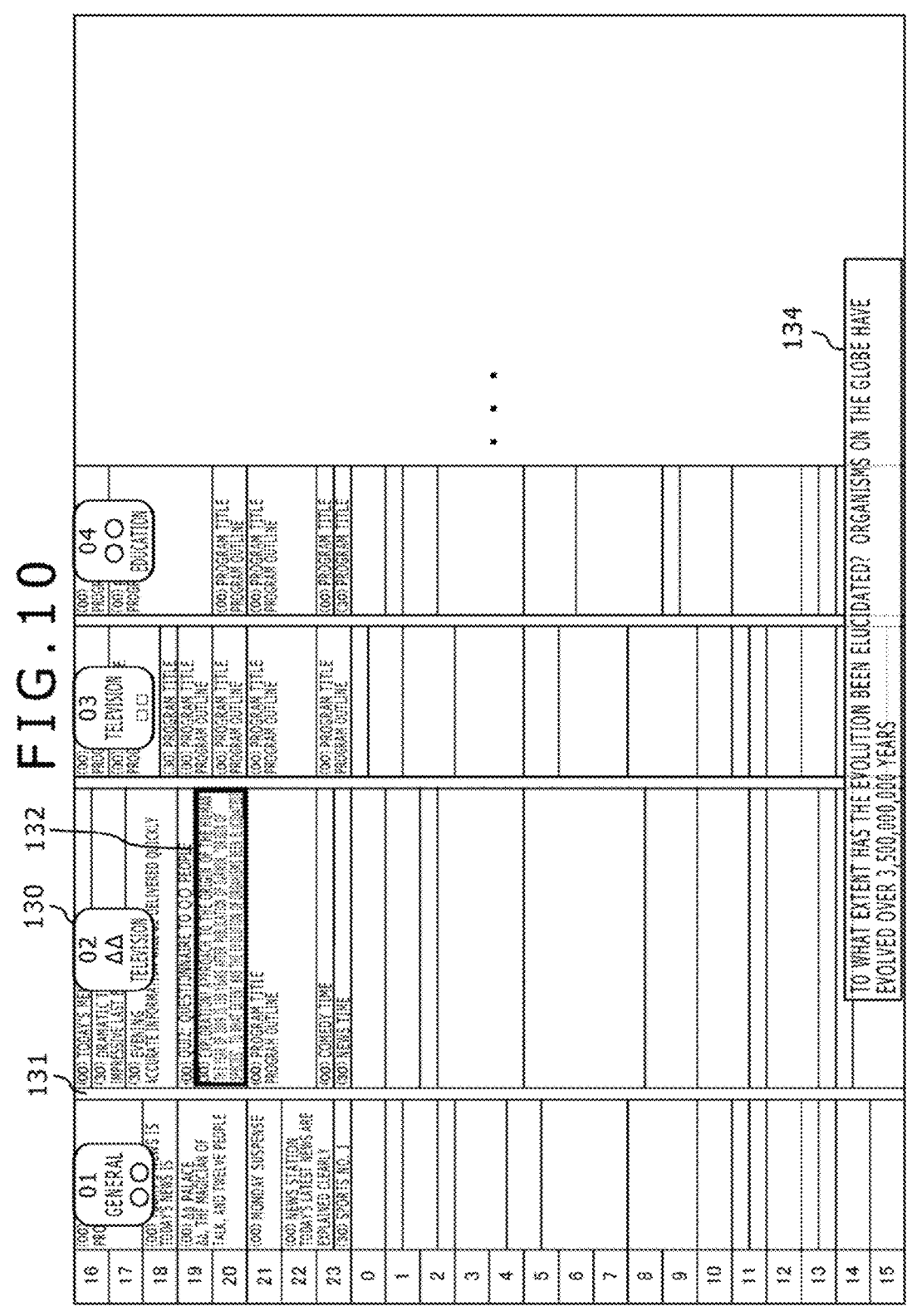

FIG. 10 depicts a display image of the second program table. FIG. 10 depicts the second program table in which program information for 24 hours is displayed. A channel label 130 is a label object for identifying a channel of a terrestrial digital television broadcast. Between adjacent channels, a channel interval 131 is disposed. It is to be noted that, in order to allow the viewer to easily grasp programs to be broadcasted in the same time zone, the displaying form of program frames may be made different among predetermined time zones (for example, for every three hours). For example, the color or the character font may be made different among the program frames.

The second program table displaying unit 94 expands or reduces the size of the region of a program frame in the second program table in response to an operation of the viewer. In particular, the second program table displaying unit 94 expands or reduces the size of a program frame per unit time and expands or reduces the size of a program frame per one channel. By this, the program information amount which can be displayed in each program frame increases or decreases. For example, the displaying form of the second program table may be changed over to "axis of ordinate=24 hours, axis of abscissa=9 channels," "axis of ordinate=5 hours, axis of abscissa=7 channels," "axis of ordinate=3 hours, axis of abscissa=5 channels," or "axis of ordinate=2 hours, axis of abscissa=3 channels."

The second program table displaying unit 94 causes "program title (for starting of broadcasting)" to be displayed in the first row of a program frame of the second program table and causes a program outline to be displayed in the second and succeeding rows. In the second program table of "axis of ordinate=24 hours, axis of abscissa=9 channels," a program frame of a program of 30 minutes is displayed in a minimum display unit, namely, in one row. Therefore, for a program of shorter than 30 minutes, the program information is displayed in a balloon in response to movement of a cursor 132 hereinafter described.

The cursor displaying unit 90 causes the cursor 132 for selecting a program frame to be displayed, and the viewer would select a program frame of a program whose detailed information the viewer wants to know or a program which the viewer wants to determine as a target of a viewing operation using the cursor 132. Consequently, the program is designated as a provisionally selected program. The second program table displaying unit 94 causes the program frame of the provisionally selected program to be displayed in a size enlarged in the channel axis direction, namely, in a size greater than that of the other program frames. Further, the second program table displaying unit 94 causes a program outline of the provisionally selected program to be displayed through scrolling in a program outline field 134.

Figure 11:
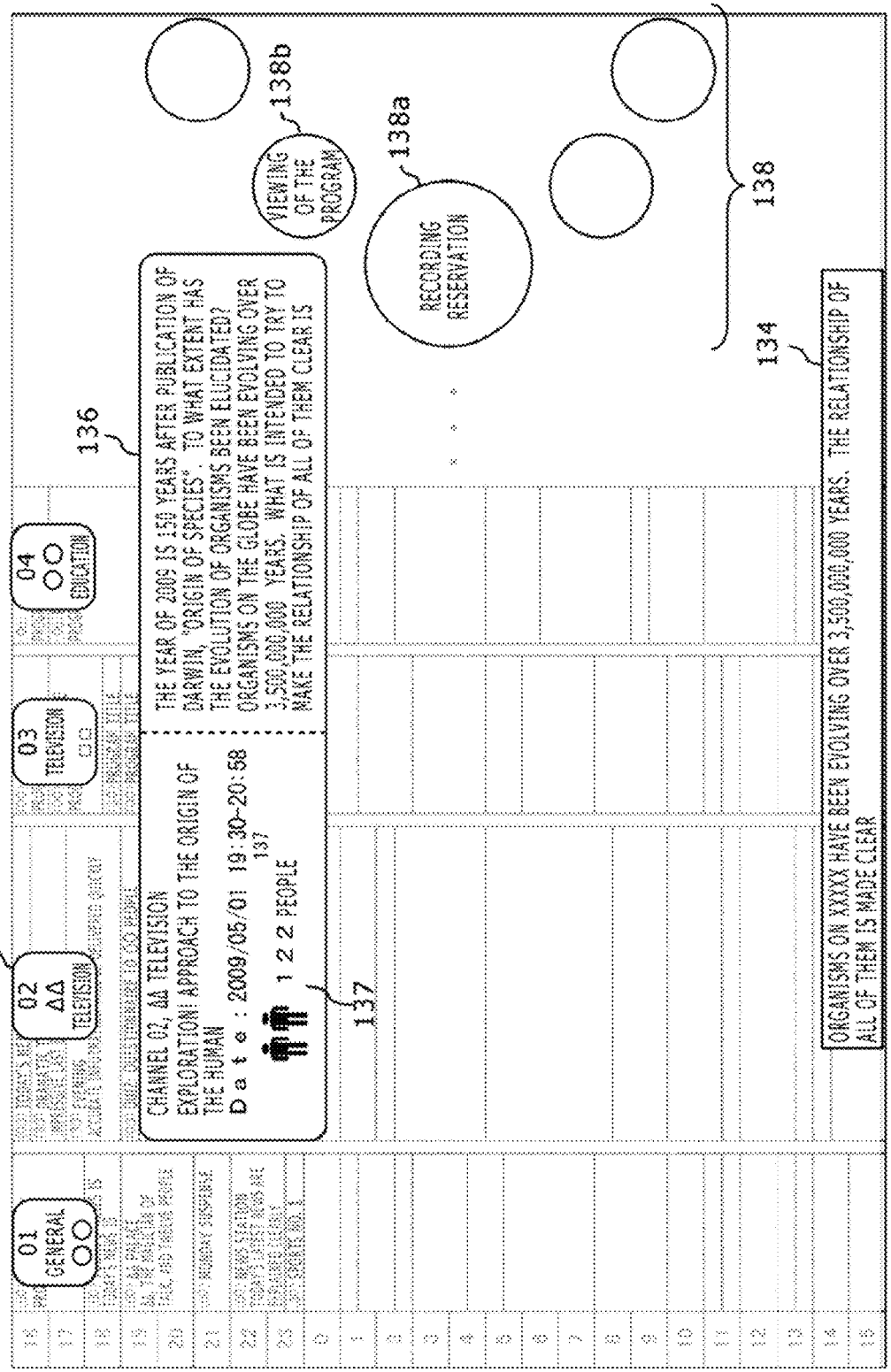
FIG. 11 is a view depicting a display image of the second program table.

Also FIG. 11 depicts a display image of the second program table. FIG. 11 illustrates a state in which the provisionally selected program in FIG. 10 is designated as a finally selected program by a predetermined operation of the user. The viewer would select an operation icon 138 such as a recording reservation icon 138a or a program viewing icon 138b to carry out a desired viewing operation for the finally selected program.

The second program table displaying unit 94 causes program information of the finally selected program (for example, a channel name, a broadcasting station name, a program title, broadcasting date and time, a viewing situation, or a program outline) to be displayed in a program details window 136. A viewing situation indicator 137 indicates the number of viewing persons of the finally selected program, and may particularly indicate a live index value, a reservation index value, or the total value of them. After the designation of the finally selected program is carried out, the second program table displaying unit 94 causes the program details window 136 to be display by popup display in an overlapping relationship with the second program table and causes the second program table, which is the background of the popup display, to be displayed with low picture quality than ever. For example, the second program table displaying unit 94 may exclude high frequency components from the image data of the second program table such that the second program table is displayed in somewhat gradating state.

Referring back to FIG. 6, if a user operation which indicates displaying of a video screen image for operating recording/playback of a program is accepted, then the video operation screen image displaying unit 96 causes the video screen image to be displayed on the display unit 14. The video operation screen image displaying unit 96 includes a recording list displaying unit 98. The recording list displaying unit 98 causes a recording list, which indicates information of recorded contents and table information of recording reservations, to be displayed on the video screen image.

FIG. 12 depicts an image of a video screen image on which a recording list is displayed. The recording list 150 displays a title, recording date and time, a status, and a playback advance ratio of recorded programs in a table. In a status field, information indicative of a status of a recorded content regarding whether or not the program is recorded already or reserved for recording already or an error has occurred. In a playback advance ratio field, a value representative of an advance degree of playback of the recorded content is set. The video operation screen image displaying unit 96 refers to the recorded information of the recording information retaining unit 52 to set a value for each field of the recording list. If a playback button 152 is selected by the viewer, then the playback processing unit 66 starts a playback process of the recorded content corresponding to the playback button 152.

Referring back to FIG. 6, the viewing situation notification unit 99 periodically transmits the program ID being displayed at present by the program video displaying unit 84, or in other words, viewing situation data which associates the program ID being viewed at present by the viewer and attribute information of the viewer with each other, to the information management server 16. Further, the viewing situation notification unit 99 periodically refers to the recorded information of the recording information retaining unit 52 and periodically transmits viewing situation data, which associates the program ID reserved for recording and the attribute information of the viewer with each other, to the information management server 16. The notification frequency of the viewing situation may be determined taking the real time property required for counting of the viewing situation and the network and system loads into consideration for comparison, and may be, for example, approximately one minute.

A behavior by the configuration described above is described below.

FIG. 13 is a flow chart illustrating a behavior of the information processing apparatus 11. FIG. 13 illustrates a behavior principally of the user interface. If a starting instruction of the program viewing AP is accepted by the information processing apparatus 11, then a portal screen image including a TV icon, a program table icon, a video icon and so forth is displayed (S10). Then, it is waited that an operation input of the viewer is detected (N at S12), and if an operation of the viewer is detected (Y at S12) and the operation is a selection operation of the TV icon (Y at S18), then a live video displaying process hereinafter described is executed (S20). If the operation is not a selection operation of the TV ion (N at S18), then the step S20 is skipped. When the operation is a selection operation of the program table icon (Y at S22), then a program table displaying process hereinafter described is executed (S24). If the operation is not a selection operation of the program table icon (N at S22), then the step S24 is skipped. If the operation is a selection operation of the video icon (Y at S26), then a video screen image displaying process hereinafter described is executed (S28). If the operation is not a selection operation of the video icon (N at S26), then the step S28 is skipped and the flow of FIG. 13 is ended.

Figure 14:
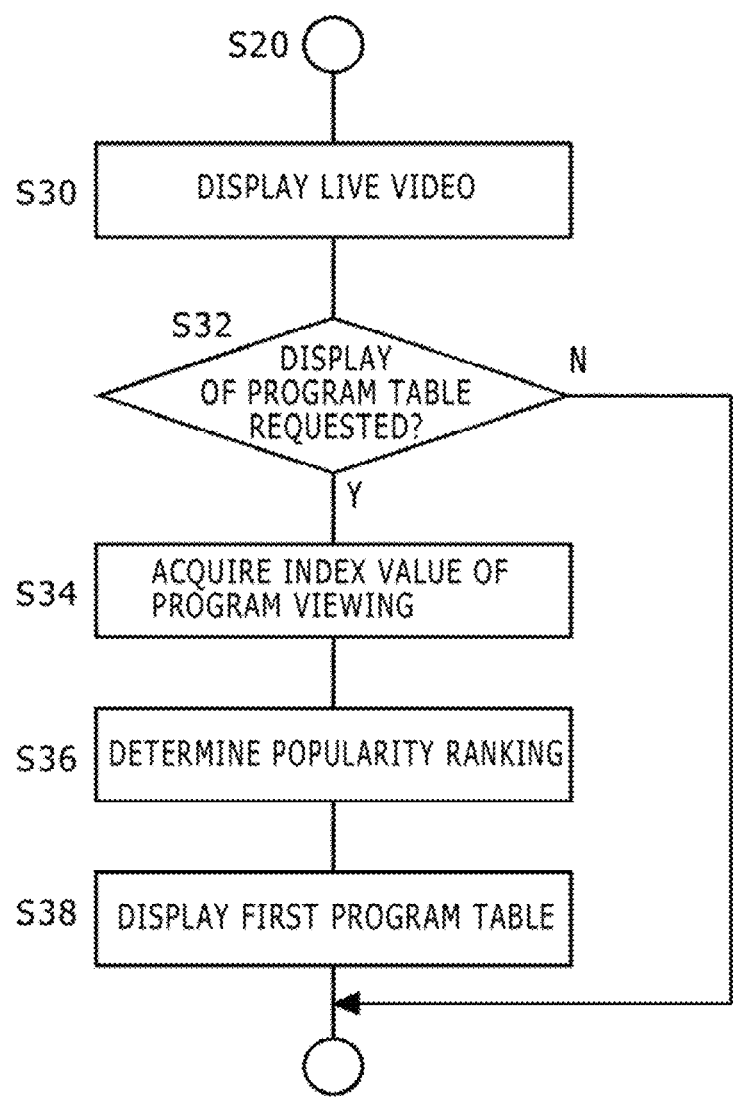
FIG. 14 is a flow chart illustrating S20 of FIG. 13 in detail.

FIG. 14 is a flow chart particularly illustrating the step S20 of FIG. 13. The program video acquisition unit 58 acquires video data of a program selected by the viewer from the tuner 13, and the program video displaying unit 84 causes a live video of the program to be displayed on the video displaying screen image 110 (S30). Here, if a displaying request for a program table is accepted (Y at S32), then the index value acquisition unit 68 acquires a live index value and a reservation index value from the information management server 16 (S34), and the popularity determination unit 70 determines a popularity ranking of the programs in accordance with the index values (S36). Then, the first program table displaying unit 92 causes a first program table, in which the program information and popularity rankings of the programs being broadcasted at present are displayed in an associated relationship with each other, to be displayed in an overlapping relationship with the video displaying screen image 110 (S38). If a displaying request for a program table is not accepted (N at S32), then the steps S34 to S38 are skipped.

Though not depicted in FIG. 14, if a raking determination interval (for example, one minute) corresponding to the counting interval of the viewing situation by the information management server 16 elapses, then the index value acquisition unit 68 acquires the latest index values again from the information management server 16. The popularity determination unit 70 updates the popularity rankings of the programs in accordance with the latest index values. The first program table displaying unit 92 causes the popularity rankings of the programs after updated to be displayed in the first program table.

Since the first program table including the ranking indicators is displayed together with the live videos of the programs in this manner, the viewer can grasp a program having high popularity at the present point of time at a glance during viewing of a desired program. It is to be noted that, in the base technology, a viewing situation is specified based on an objective viewing behavior such as viewing of a program or a recording reservation. Consequently, a viewing situation can be specified with a higher degree of accuracy than that in an alternative case in which a viewing situation is based on a subjective index of a viewer to a program such as "favorable, unfavorable, or willing to view."

Further, since changeover of a channel can be carried out by an operation of the first program table, the viewer can select an interesting program at any time based on varying popularity rankings. Further, since an advance situation of each program or a transition situation of the popularity ranking of the programs is displayed in the first program table, the viewer can select a program to be viewed taking such situations into consideration. Further, since a program outline of a program selected by the cursor is displayed in the program outline field 124 by scrolling display, the region of the first program table can be suppressed while a desired program outline is confirmed by the viewer. Consequently, the visibility of a program video can be maintained readily.

Figure 15:
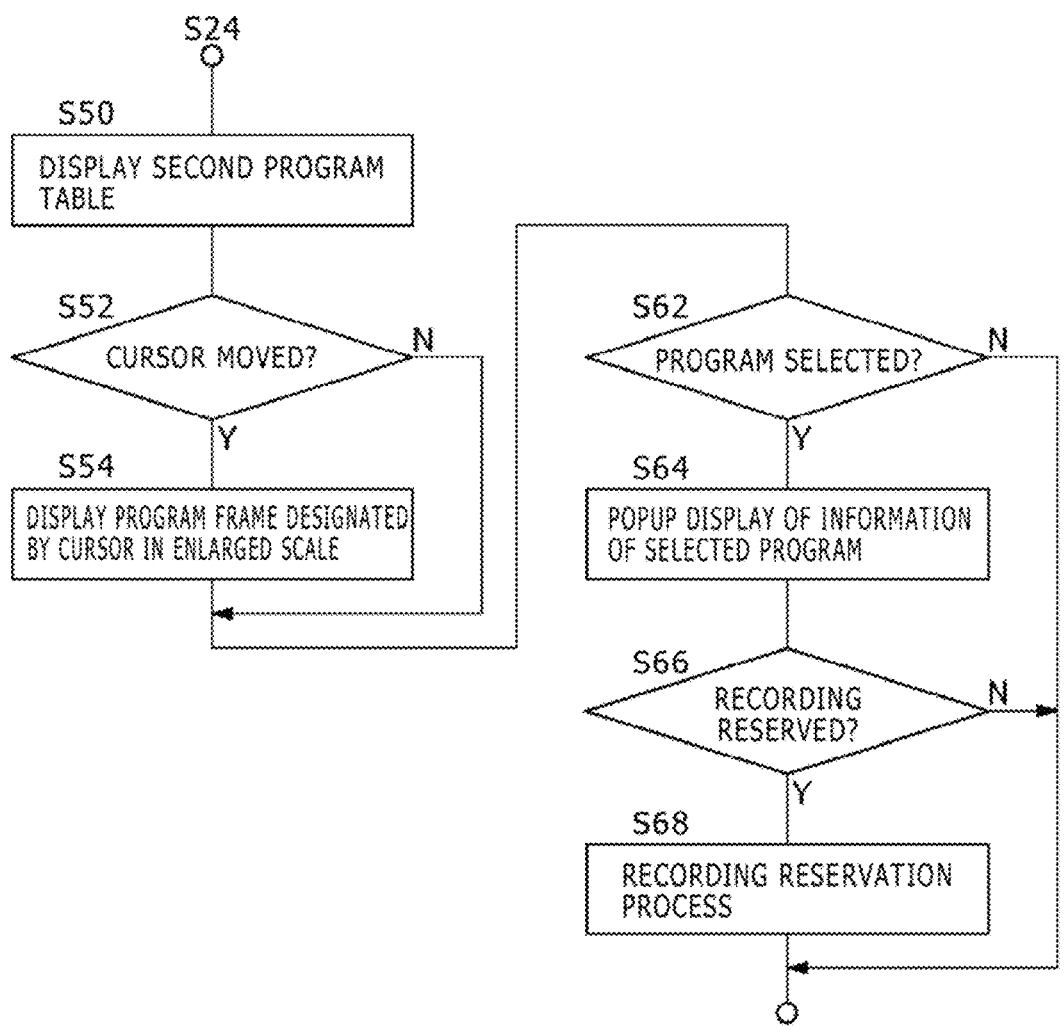
FIG. 15 is a flow chart illustrating S24 of FIG. 13 in detail.

FIG. 15 is a flow chart illustrating details of the step S24 of FIG. 13. The second program table displaying unit 94 causes the second program table to be displayed based on the program information of the program information retaining unit 50 (S50). The cursor displaying unit 90 moves the displaying position of the cursor between a plurality of program frames of the second program table in response to an operation of the viewer. When the cursor moves (Y at S52), the second program table displaying unit 94 causes the program frame designated by the cursor, in other words, the program frame of the provisionally selected program, to be displayed in a scale enlarged from the program frames of the other channels (S54). If there is no movement of the cursor (N at S52), then the step S54 is skipped.

Then, if a program of a viewing operation target is selected in the second program table, or in other words, if designation of a finally selected program is carried out (Y at S62), then the second program table displaying unit 94 causes the program information of the selected program to be displayed by popup display in the program details window 136 (S64). At this time, the operation icon 138 is displayed in conformity with the program details window 136. Further, the second program table which is the background is displayed in a gradating state. If a recording reservation is set for the finally selected program (Y at S66), then the recording processing unit 64 executes a predetermined recording reservation process and stores, for example, recording reservation information into the recording information retaining unit 52 (S68). If no recording reservation is set (N at S66), then the step S68 is skipped. If a finally selected program is not designated (N at S62), then the steps S64 to S68 are skipped.

With the present form, the region of a program frame selected by the cursor in the second program table is enlarged dynamically, and a greater amount of program information than that before the selection is displayed. Consequently, the necessity for such an operation as an operation for causing a separate screen image to be displayed in order for the viewer to confirm program information decreases. In other words, the operation of the viewer for confirming program information is simplified and the convenience of the electronic program table is improved. Further, since the second program table and the program details window 136 are displayed in an overlapping relationship with each other, a viewing operation for a program can be carried out while the time spent for the viewing of the second program table or the program position in the second program table remains in the impression of the viewer. Further, by lowering the picture quality of the second program table which becomes the background of the program details window 136, the visibility of the program details window 136 can be improved relatively.

Figure 16:
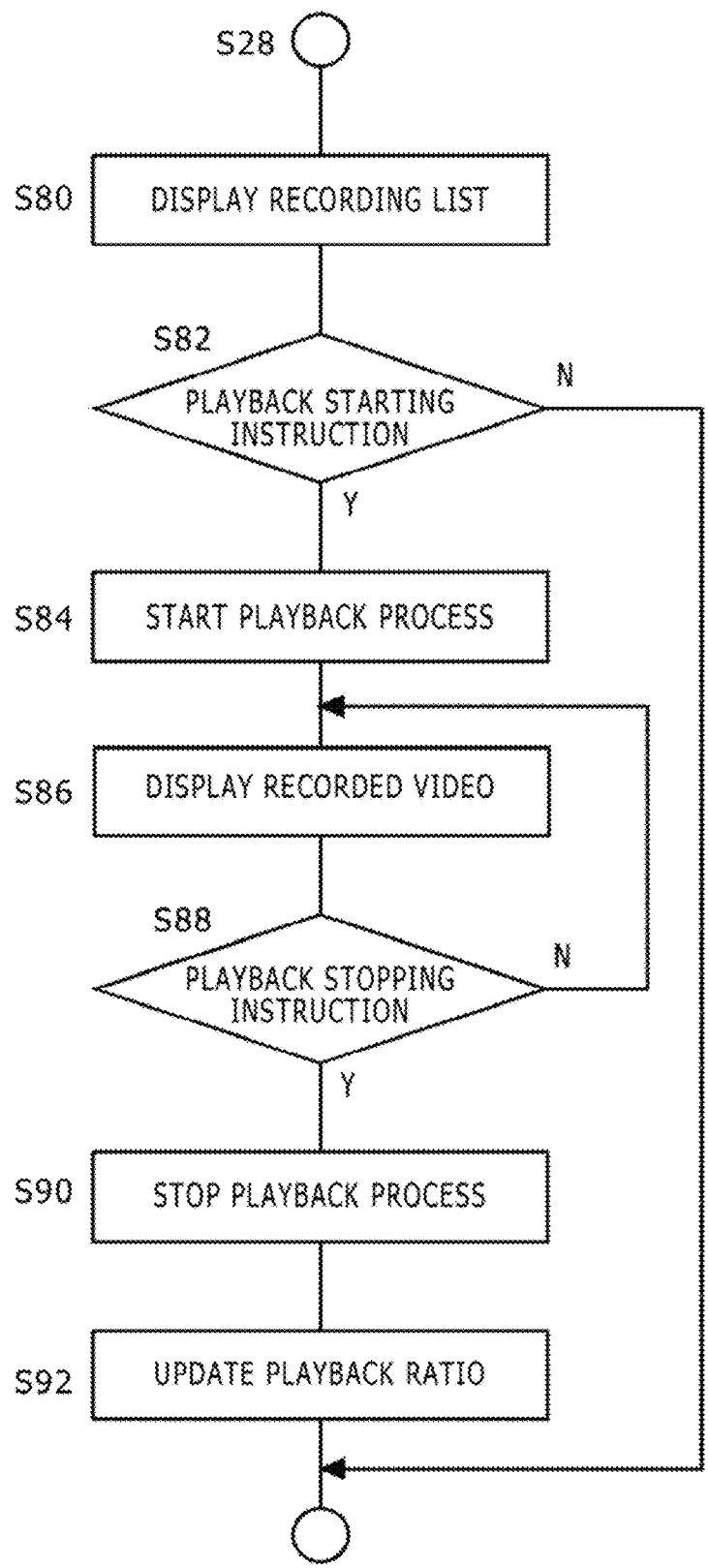
FIG. 16 is a flow chart illustrating S28 of FIG. 13 in detail.

FIG. 16 is a flow chart particularly illustrating the step S28 in FIG. 13. The video operation screen image displaying unit 96 causes a video screen image to be displayed, and the recording list displaying unit 98 causes a recording list 150 to be displayed in the video screen image (S80). In this recording list, a recorded content whose playback is interrupted midway is displayed in a form in which this is suggested. In particular, a playback advance ratio representative of an advance degree of playback is displayed in an associated relationship with each recorded content. Consequently, the viewer can efficiently determine a recorded content to be played back.

If a playback starting request is accepted (Y at S82), then the playback processing unit 66 starts a playback process of the recorded content (S84) and successively sends data of the recorded video to the program video displaying unit 84. The program video displaying unit 84 causes the recorded video to be displayed on the display unit 14 (S86). If a playback stopping instruction is not accepted (N at S88), then the processing returns to step S86. If a playback stopping instruction is accepted (Y at S88), then the playback processing unit 66 stops the playback process of the recorded content (S90) and stores the playback advance rate at the point of time into the recording information retaining unit 52 (S92). If a playback starting instruction is not accepted (N at S82), then the steps S84 to S92 are skipped.

Figure 17:
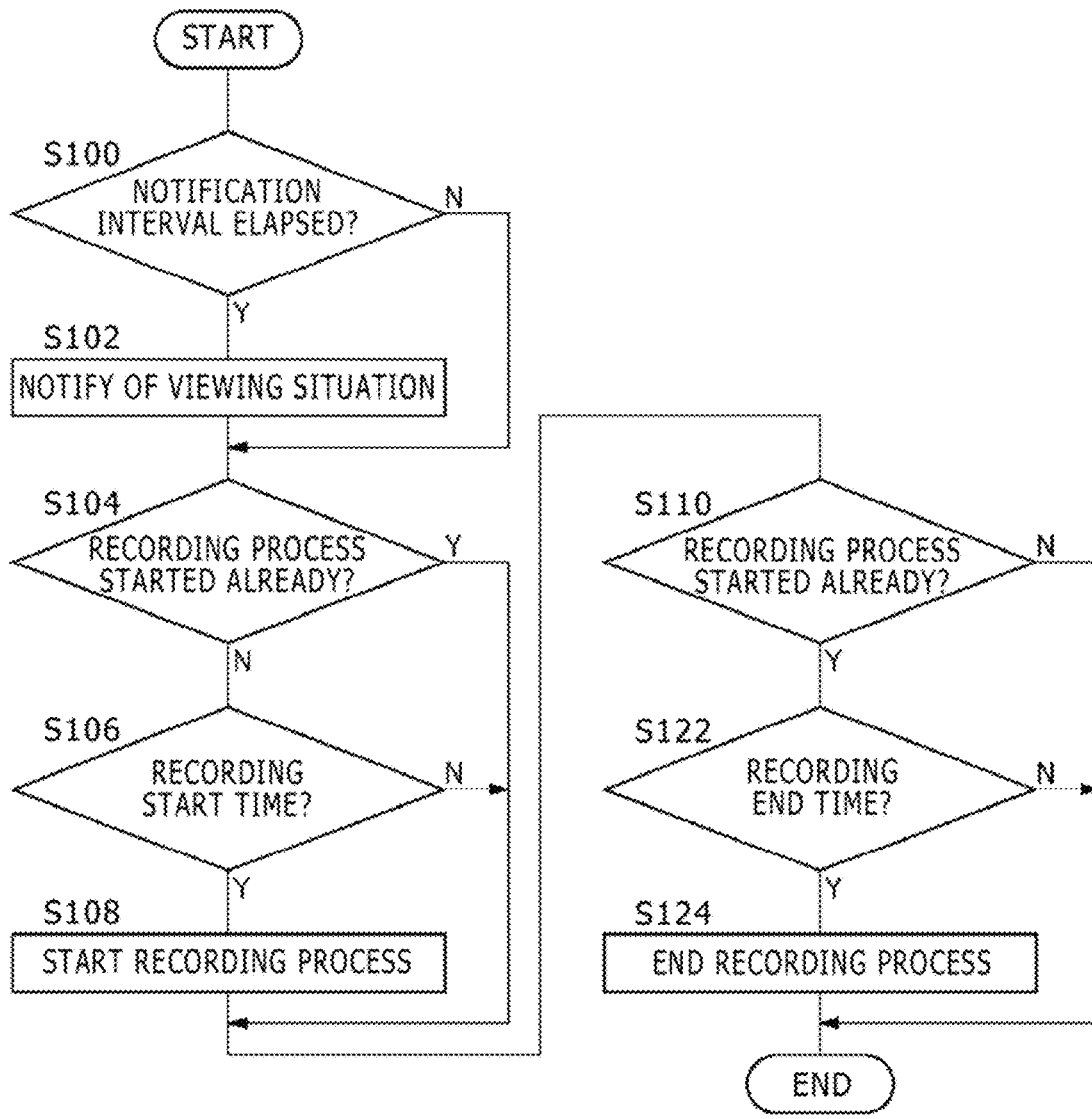
FIG. 17 is a flow chart illustrating a behavior of the information processing apparatus.

FIG. 17 is a flow chart illustrating a behavior of the information processing apparatus 11. FIG. 17 principally illustrates a behavior executed as a background process. If a notification interval (for example, one minute) determined in advance elapses (Y at S100), then the viewing situation notification unit 99 notifies the information management server 16 of a program ID with regard to which a live video is being displayed and a program ID or IDs reserved already for recording (S102). If the notification interval does not elapse (N at S100), then the step S102 is skipped. The recording processing unit 64 refers to recording information of the recording information retaining unit 52 to execute a reserved recording process. In particular, if a recording process is not started as yet (N at S104) and the recording start time comes (Y at S106), then the recording processing unit 64 starts a recording process (S108). If the recording start time does not come (N at S106), then the step S108 is skipped. If a recording process is started already (Y at S104), then the steps S106 and S108 are skipped. If a recording process is started already (Y at S110) and recording end time comes (Y at S122), then the recording processing unit 64 ends the recording process (S124). If a recording process is not started as yet (N at S110) or the recording end time does not come (N at S122), then the step S124 is skipped.

The form of the base technology has been described. The present form is illustrative, and it is recognized by those skilled in the art that various modifications are possible with regard to a combination of the components and the processing procedures described hereinabove and that also such modifications are included in the scope of the base technology.

Although, in the description of the form of the base technology above, it is described that the first program table is displayed in a displaying form in which it reflects popularity rankings of programs, the second program table is not described. In a modification, also the second program table may be displayed in a displaying form in which popularity rankings of programs are reflected. In this case, the second program table displaying unit 94 may vary the displaying form (color, character font or the like) of program frames of the second program table in accordance with popularity rankings determined by the popularity determination unit 70. Further, data of ranking indicators or index values themselves may be displayed in an associated relationship with program frames. According to this form, useful information can be provided to the viewer who selects a program to be made a target of a viewing operation from within the second program table. For example, programs reserved for recording by many other viewers can be suggested to the viewer, and it is possible to support the viewer to determine a program to be reserved for recording.

Further, in the form of the base technology described hereinabove, a popularity ranking of each program is determined by the information processing apparatus 11. In a modification, popularity rankings of all attributes of viewers with regard to programs and popularity rankings for individual viewer attributes may be determined by the information management server 16. In this case, the index value acquisition unit 68 of the information processing apparatus 11 may acquire the popularity rankings as index values, and the popularity determination unit 70 may send the acquired popularity rankings as they are to the data processing unit 56.

Embodiment

As described hereinabove, in television broadcasting, multi-channeling over a plurality of broadcasting types is being implemented. The plural broadcasting types are different in a transmitting form of a broadcasting signal from each other and include, for example, broadcasting in which a broadcasting signal is transmitted by terrestrial waves (terrestrial digital method), broadcasting in which a broadcasting signal is transmitted through a broadcasting satellite (BS broadcasting) and broadcasting in which a broadcasting signal is transmitted through a communication satellite (CS broadcasting). It is to be noted that the BS broadcasting and the CS broadcasting are different, for example, in transmission power, frequency band to be used and so forth.

Together with promotion of such multi-channeling as described above and popularization of ICT apparatus, a user sometimes owns a plurality of tuners or recording apparatus and selectively uses them in order to view or record a large number of broadcasting contents. The information processing apparatus 11 of the embodiment provides, in addition to the functions of the information processing apparatus 11 described in the description of the base technology, a function for autonomously selecting, from among a plurality of recording apparatus and tuners, an equipment suitable for viewing and recording of a program.

Figure 18:
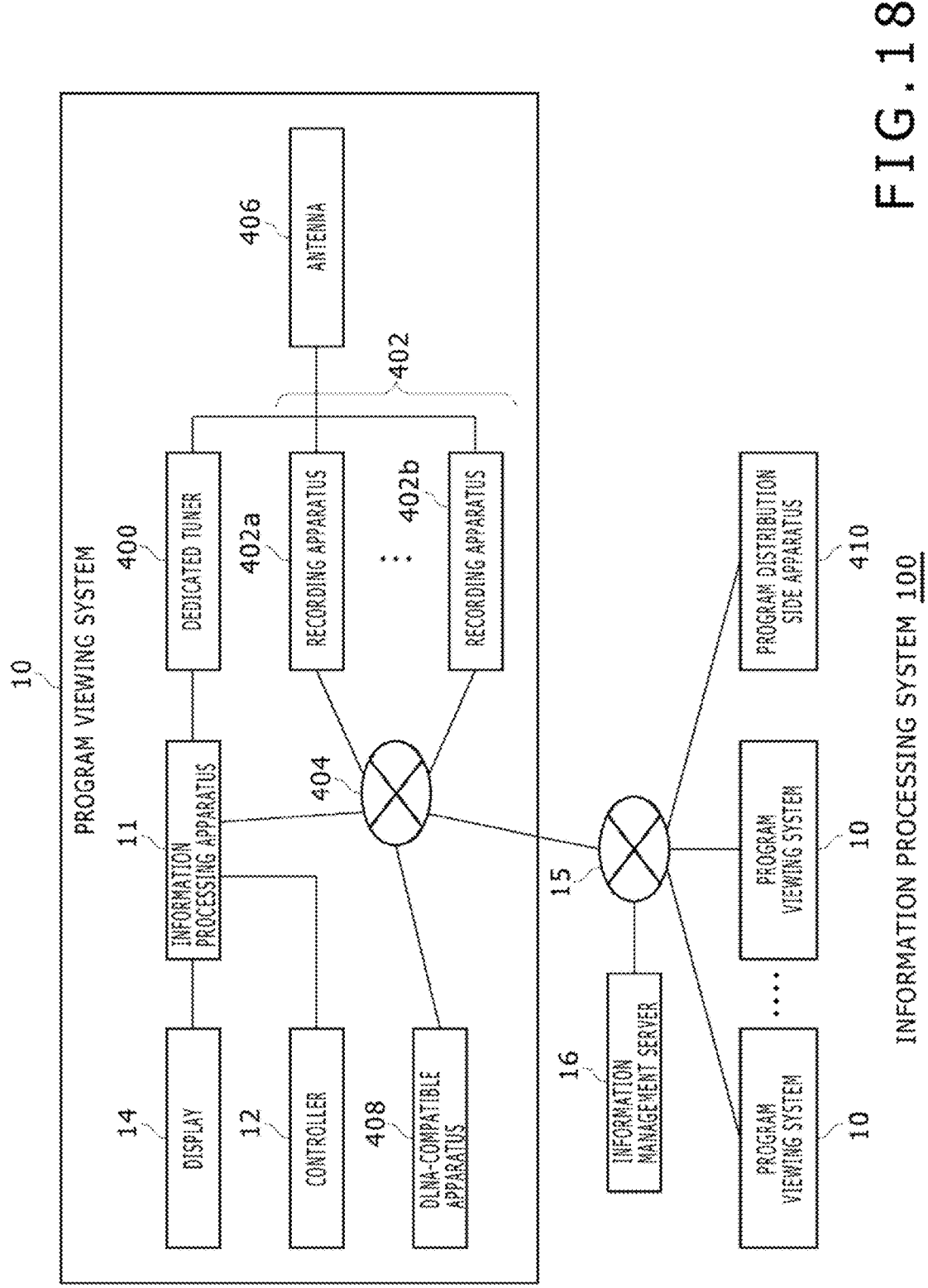
FIG. 18 is a view depicting an information processing system of an embodiment.

FIG. 18 depicts a configuration of the information processing system 100 of the embodiment. The information processing apparatus 11 in the information processing system 100 of the embodiment behaves as a DLNA client which communicates with an external apparatus in compliance with the DLNA (Digital Living Network Alliance) standard. A DLNA-compatible apparatus 408 is, for example, a digital television set or a BD recorder (Blu-ray disk recorder) and behaves as a DLNA client similarly to the information processing apparatus 11.

Typically, the program viewing system 10 is constructed in a home of a user (namely, a viewer), and a LAN 404 is a home network of the user including communication apparatus such as a layer 2 switch and is a communication network in compliance with the DLNA standard or a compatible standard with the DLNA standard. The information processing apparatus 11 and the DLNA-compatible apparatus 408 are connected to a recording apparatus 402a and another recording apparatus 402b generally referred to as recording apparatus 402 through the LAN 404.

Each recording apparatus 402 behaves as a DLNA server and provides, in addition to the program recording function as a PVR, a function of a digital tuner. In particular, the recording apparatus 402 is also a general purpose tuner which provides a service as a digital tuner to various DLNA clients including the information processing apparatus 11 and the DLNA-compatible apparatus 408. On the other hand, a dedicated tuner 400 corresponds to the tuner 13 in the embodiment and is a digital tuner for exclusive use for the information processing apparatus 11. The dedicated tuner 400 is connected directly to the information processing apparatus 11 by a USB cable.

Each of the dedicated tuner 400, recording apparatus 402a, and recording apparatus 402b is a single tuner and receives broadcasting signals of terrestrial digital broadcasting, BS broadcasting, and CS broadcasting through an antenna 406. It is a matter of course that, as a modification, the dedicated tuner 400, recording apparatus 402a, and recording apparatus 402b may receive broadcasting signals through different antennae from each other. It is assumed that, in the present embodiment, the dedicated tuner 400 receives only signals of terrestrial digital broadcasting; the recording apparatus 402a receives signals of all of terrestrial digital broadcasting, BS broadcasting, and CS broadcasting; and the recording apparatus 402b receives signals of ground terrestrial broadcasting and CS broadcasting.

A program distribution side apparatus 410 is an information processing apparatus on the company side which distributes terrestrial digital broadcasting, BS broadcasting, and CS broadcasting. In the present embodiment, the program distribution side apparatus 410 stores unique contract numbers recorded in B-CAS (registered trademark) cards on the user side (such a contract number is hereinafter referred to also as "user contract number") and channels which can be viewed by users who possess the contract numbers in an associated relationship with each other. For example, the program distribution side apparatus 410 stores, with regard to pay channels which require a pre-contract for viewing with a user, user contract numbers and identification information of those channels contracted by the users in an associated relationship with each other. It can be said that a channel contracted by a user is a channel whose viewing by the user is permitted, and also it can be said that the channel is a channel whose decoding by a tuner on the user side is permitted. As hereinafter described, the program distribution side apparatus 410 accepts an inquiry about channels which can be viewed by a user whose contract number is designated, and provides identification information of one or more channels associated with the user contract number to the recording apparatus 402.

Figure 19:
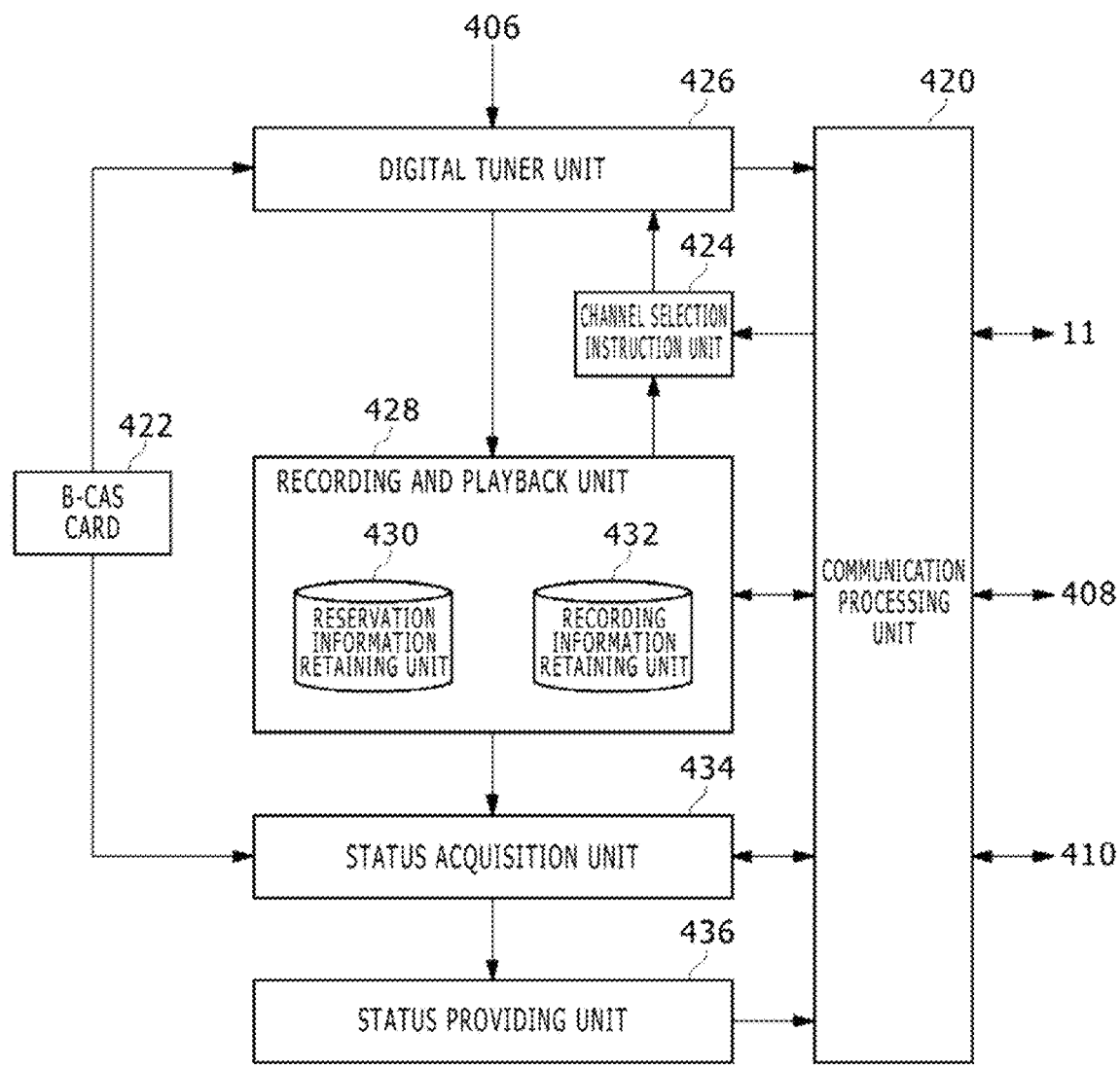
FIG. 19 is a block diagram depicting a functional configuration of a recording apparatus of FIG. 18.

FIG. 19 is a block diagram depicting a functional configuration of the recording apparatus 402 of FIG. 18. The recording apparatus 402 includes a communication processing unit 420, a B-CAS card 422, a channel selection instruction unit 424, a digital tuner unit 426, a recording and playback unit 428, a status acquisition unit 434, and a status providing unit 436.

The communication processing unit 420 transmits and receives data to and from the information processing apparatus 11, DLNA-compatible apparatus 408, and program distribution side apparatus 410 through the LAN 404. Particularly with the information processing apparatus 11 and the DLNA-compatible apparatus 408, the communication processing unit 420 communicates by the HTTP in compliance with the DLNA standard. Further, the communication processing unit 420 further includes an encryption unit not shown. The encryption unit encrypts channel selection data or EPG data outputted from the digital tuner unit 426 hereinafter described or playback data outputted from the recording and playback unit 428 in accordance with the DTCP-IP (Digital Transmission Control Protection over Internet Protocol). The communication processing unit 420 transmits the encrypted data to the information processing apparatus 11 and the DLNA-compatible apparatus 408 in accordance with the HTTP.

The recording apparatus 402 behaves as a DLNA server and permits and sets communication sessions with DLNA clients while the number of communication sessions is limited to a number determined in advance as an upper limit. For example, as regards a communication session for viewing a live video of a broadcasting program, or in other words, as regards a communication session for distributing data of a video, an audio or the like being broadcasted through each channel at present by stream distribution, only one session is permitted at the same time. Accordingly, a DLNA client who can acquire a live video of a broadcasting program using the recording apparatus 402a is, at a certain point of time, one of the information processing apparatus 11 and the DLNA-compatible apparatus 408. In the meantime, as regards a session for viewing a played back video of a recorded program, namely, as regards a session for distributing a video, an audio or the like of a played back recorded content by stream distribution, up to two sessions are permitted at the same time.

The B-CAS card 422 is an IC card in which a user contract number (ID number) and a decryption key for decrypting data encrypted by the MULTI2 which is an encryption form of a digital broadcast are recorded in an IC chip. The channel selection instruction unit 424 accepts a channel selection instruction indicative of identification information (for example, a service ID) of a channel selected by the user from the information processing apparatus 11 through the communication processing unit 420 and transfers the channel selection instruction to the digital tuner unit 426. Further, the channel selection instruction unit 424 accepts a channel selection instruction indicative of identification information (for example, a service ID) of a channel of a recording target program from the recording and playback unit 428 and transfers the channel selection instruction to the digital tuner unit 426.

The digital tuner unit 426 receives terrestrial digital broadcasting, BS broadcasting, and CS broadcasting and acquires various data (for example, a video, an audio, a subtitle and so forth, hereinafter referred to also as "selected channel data") of a channel designated by a channel selection instruction from the channel selection instruction unit 424 from within the broadcasting signal. Further, the digital tuner unit 426 acquires the EPG data superimposed on the broadcasting signal. The digital tuner unit 426 provides selection channel data and EPG data to the information processing apparatus 11 and the DLNA-compatible apparatus 408 through the communication processing unit 420. Further, the digital tuner unit 426 transfers the selection channel data to the recording and playback unit 428 so as to be recorded.

The configuration of the digital tuner unit 426 is described in detail. The digital tuner unit 426 includes a demodulation unit, a decoding unit, a DMX (Demultiplexer) unit, and a Mux (Multiplexer) unit not depicted. The demodulation unit demodulates an analog signal received by the antenna 406 into a digital signal and passes the digital signal to the decoding unit. The decoding unit uses the decryption key retained in the B-CAS card 422 to decode the broadcasting signal encrypted by the MULTI2.

The DMX unit extracts data of the channel designated by the channel selection instruction unit 424 from within a Full-TS stream of the broadcasting signal decoded by the decoding unit. Then, the DMX unit demultiplexes the extracted data into video data (Video), audio data (Audio), additional data such as a subtitle, and EPG data.

The MUX unit multiplexes the video data, audio data, and additional data from within the data demultiplexed by the DMX unit again to generate a TS packet (also called "Partial-TS"). The MUX unit thereby generates a Partial-TS, which does not include data other than data of the channel of the viewing target or the recording target, from the Full-TS stream. The Partial-TS is hereinafter referred to also as selected channel data. It is to be noted that the MUX unit may otherwise multiplex the video data, audio data, and additional data in a form in which they are broadcasted or may encode the data again and suitably change the bit rate, picture frame, audio channel number, codec and so forth. It is to be noted that also the configuration of the signal processing unit 206 of the dedicated tuner 400 is similar to that of the digital tuner unit 426.

The recording and playback unit 428 includes a reservation information retaining unit 430 and a recording information retaining unit 432. The reservation information retaining unit 430 retains recording reservation information set by the information processing apparatus 11 or the DLNA-compatible apparatus 408. This recording reservation information includes information designating, for example, a recording target channel, a recording target program, recording date and time (namely, program broadcasting date and time), a recording mode and so forth. The recording information retaining unit 432 retains data of recording contents including videos and audios of recorded programs. The recording information retaining unit 432 corresponds to the recording information retaining unit 52 of the information processing apparatus 11 and retains, for example, the recoding information illustrated in FIG. 8.

The recording and playback unit 428 accepts recording reservation information transmitted from the information processing apparatus 11 or the DLNA-compatible apparatus 408 through the communication processing unit 420 and stores the recording reservation information into the reservation information retaining unit 430. The recording and playback unit 428 refers to the recording reservation information retained in the reservation information retaining unit 430, and if it detects that the start time of a recording reserved program (namely, recording start time) is reached, then it notifies the digital tuner unit 426 of a channel selection instruction which indicates a channel of the recording reservation target through the channel selection instruction unit 424. Then, the recording and playback unit 428 encrypts the selection channel data outputted from the digital tuner unit 426 by the AES and stores the encrypted selection channel data into the recording information retaining unit 432.

Further, the recording and playback unit 428 accepts a playback instruction transmitted from the information processing apparatus 11 or the DLNA-compatible apparatus 408 through the communication processing unit 420. Then, the recording and playback unit 428 decodes the data of the recording content designated by the playback instruction by the AES and passes the decoded data as playback data to the communication processing unit 420. The communication processing unit 420 encrypts the playback data in accordance with the DTCP-IP and transmits the encrypted playback data to the information processing apparatus 11 or the DLNA-compatible apparatus 408 which is the requesting source of the playback instruction. Also a recording apparatus built in the information processing apparatus 11 (for example, the recording processing unit 64 or the recording information retaining unit 52) is similar to that of the recording and playback unit 428.

The status acquisition unit 434 accepts an acquisition request of status information of the recording apparatus 402 from the information processing apparatus 11 and collects status information relating to a behavior situation or a use situation of the recording apparatus 402 at present, viewing of a broadcasting program and limitation to recording. The status providing unit 436 provides the status information collected by the status acquisition unit 434 to the information processing apparatus 11.

In particular, the status acquisition unit 434 acquires information representative of a table of channels through which a broadcasting signal can be received from the digital tuner unit 426. Further, the status acquisition unit 434 acquires a user contract number from the B-CAS card 422. Then, the status acquisition unit 434 uses the user contract number as a key to issue an inquiry to the program distribution side apparatus 410 about channels included in the contract with the user, or in other words, channels which can be viewed by the user, or further in other words, channels whose decoding by the digital tuner unit 426 is permitted. Then, the status acquisition unit 434 acquires information representative of a table of channels included in the contract with the user from the program distribution side apparatus 410. It is to be noted that it is a matter of course that, if information indicative of a table of channels included in the contract with the user is retained in the recording apparatus 402 (for example, in the digital tuner unit 426 or the like) in advance, then also the retained information may be acquired.

Further, the status acquisition unit 434 refers to the recording reservation information of the reservation information retaining unit 430 to specify a time zone for which a recording reservation is set already, a channel of a recording reservation target and, a storage size required for recording. This storage size may be calculated by the recording and playback unit 428 in response to recording time or a recording mode (picture quality setting or the like) or may otherwise be calculated by the status acquisition unit 434 itself. Further, the status acquisition unit 434 refers to the recording information retaining unit 432 to acquire a free space of the storage which can be used for program recording. Further, the status acquisition unit 434 acquires a number of sessions at present with the DLNA client and types of the sessions (viewing of broadcasting programs or playback viewing of recorded contents) from the communication processing unit 420.

The status providing unit 436 provides the status information of the recording apparatus 402 acquired by the status acquisition unit 434 to the information processing apparatus 11. This status information includes information of a table of channels which can be received by the recording apparatus 402, a table of channels included in the contract with the user, time zones set already for recording reservations, recording target channels and required storage sizes in the recording reservations, the free space of the storage, and the session number at present and the types of the sessions. It is to be noted that, although, in the present embodiment, the information described above is provided as a single piece of status information, it is a matter of course that an individual information acquisition request may be accepted for each information type to provide the individual status information. It is to be noted that, though not depicted in FIG. 2, also the dedicated tuner 400 may have functions corresponding to the status acquisition unit 434 and the status providing unit 436.

Figure 20:
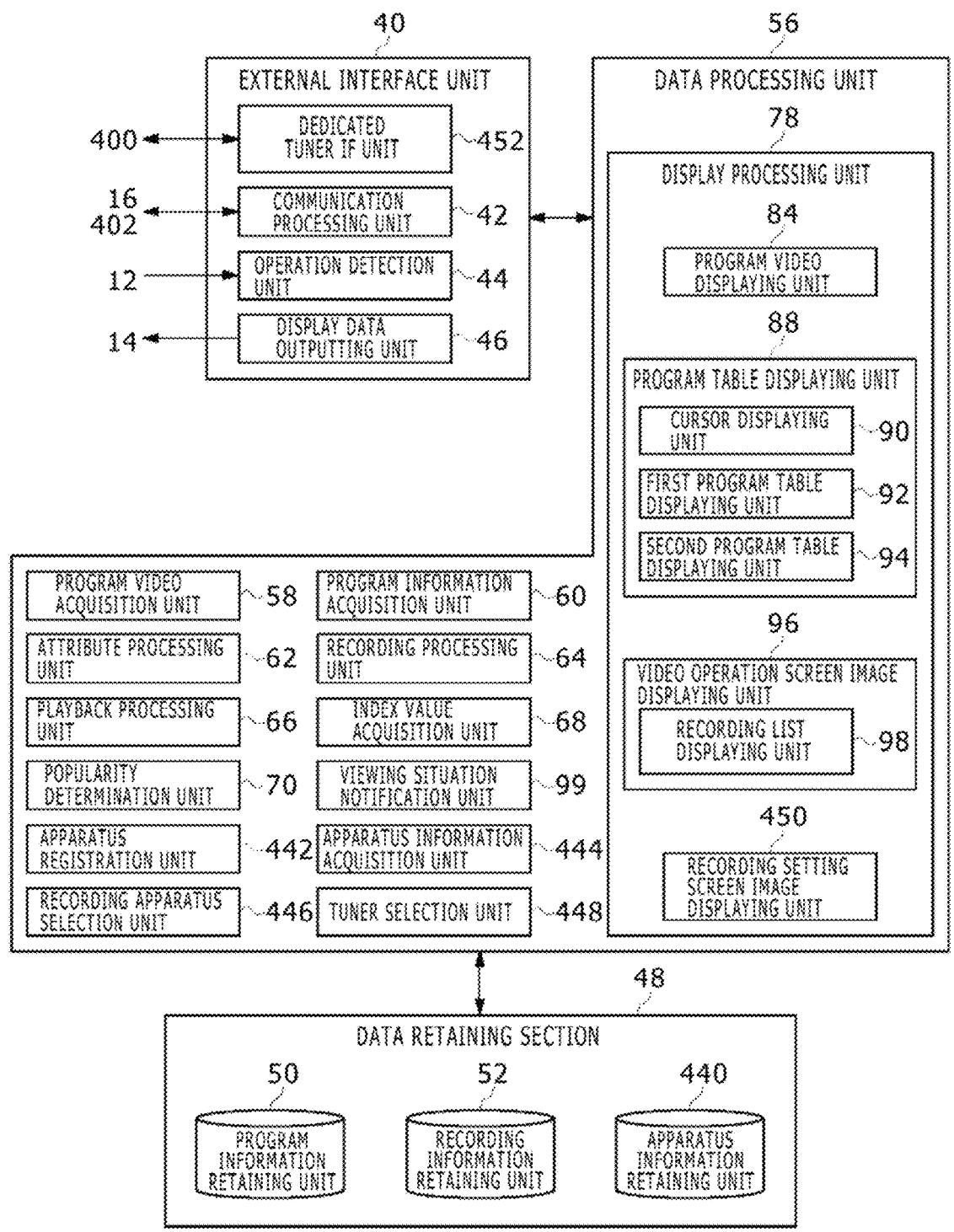
FIG. 20 is a block diagram depicting a functional configuration of an information processing apparatus of FIG. 18.

FIG. 20 is a block diagram depicting a functional configuration of the information processing apparatus 11 of FIG. 18. The data retaining unit 48 of the information processing apparatus 11 of the present embodiment further includes an apparatus information retaining unit 440. The data processing unit 56 of the information processing apparatus 11 further includes an apparatus registration unit 442, an apparatus information acquisition unit 444, a recording apparatus selection unit 446, and a tuner selection unit 448. Meanwhile, the display processing unit 78 further includes a recording setting screen image displaying unit 450.

A dedicated tuner IF unit 452 corresponds to the tuner IF unit 41 described in the description of the base technology and is an interface for directly connecting to the dedicated tuner 400 by the USB. Further, the communication processing unit 42 functions as an interface with the recording apparatus 402 and particularly carries out HTTP communication with the recording apparatus 402 through the LAN 404. The program information acquisition unit 60 acquires EPG data from the dedicated tuner 400, recording apparatus 402*a*, and recording apparatus 402*b* and stores the EPG data into the program information retaining unit 50. Consequently, information of the program tables of the terrestrial digital broadcasting, BS broadcasting, and CS broadcasting is retained in the program information retaining unit 50.

The apparatus information retaining unit 440 retains information (hereinafter referred to also as "apparatus information") of various apparatus relating to viewing or recording of a broadcasting program by the user. The apparatus information includes status information provided from the recording apparatus 402. Further, the apparatus information can be said as information representative of a limitation to viewing or recording of a broadcasting program by the user as depicted in FIG. 21 or can be said as information representative of a limitation to channels which can be viewed by the user.

FIG. 21 illustrates apparatus information retained by the apparatus information retaining unit 440. In an apparatus ID column, identification information of an apparatus is stored. In FIG. 21, a tuner function for exclusive use for the information processing apparatus 11 (for example, the dedicated tuner 400) and a recording function (for example, the recording processing unit 64 or the recording information retaining unit 52) are represented as "local." Meanwhile, regarding the recording apparatus 402*a* and the recording apparatus 402*b* which provide a tuner function and a recording function not only to the information processing apparatus 11 but also to a DLNA client, individual apparatus information is retained.

In an initial priority column, an initial value of the priority when a recording destination is to be selected is stored. In the present embodiment, an initial value higher than that of the local is allocated to the recording apparatus 402. This is because it is estimated that the user purchased the recording apparatus 402 in order to use the recording apparatus 402 as a storage apparatus. Further, the reason is that it is estimated that the recording process of the recording apparatus 402 is executed independently irrespective of the starting state of the information processing apparatus 11, and, during recording of the recording apparatus 402, the information processing apparatus 11 can execute a different process (game or the like) in parallel, which is high in convenience to the user.

In a receivable channel column, information representative of a table of channels which can be received by the individual apparatus is stored. For example, the information may be a table of service IDs which are identification information of the channels which can be received by the individual apparatus. It is assumed that, in the present embodiment, the local (dedicated tuner 400) receives only channels of the terrestrial digital broadcasting; the recording apparatus 402*a* receives channels of any of the terrestrial digital broadcasting, BS broadcasting, and CS broadcasting; and the recording apparatus 402*b* receives channels of the terrestrial digital broadcasting and CS broadcasting.

In a viewable channel column, information representative of a table of channels included in the contract for viewing with the user by the user contract numbers which the B-CAS cards of the individual apparatus retain is stored. For example, the information may be a table of channels included in the contract for the individual apparatus, in other words, a table of service IDs which are identification information of channels which can be viewed using the individual apparatus. It is to be noted that, in FIG. 21, also the number of viewable channels for the individual broadcasting types which can be received by the individual apparatus is indicated.

Referring back to FIG. 20, if the operation detection unit 44 detects a connection apparatus updating operation by the user, then the apparatus registration unit 442 uses the SSDP (Simple Service Discovery Protocol) prescribed by the DLNA to detect a connection situation to the recording apparatus 402. If it is detected that a connection state to the recording apparatus 402 is established, then the apparatus registration unit 442 causes the apparatus information acquisition unit 444 to acquire status information of the recording apparatus 402 and records the apparatus information including the status information into the apparatus information retaining unit 440. It is to be noted that the apparatus information of the local (dedicated tuner 400) is registered in the apparatus information retaining unit 440 in advance.

The apparatus information acquisition unit 444 transmits an acquisition request for status information to the recording apparatus 402 when a new recording apparatus 402 is detected by the apparatus registration unit 442 or in response to an instruction from the recording apparatus selection unit 446 and the tuner selection unit 448 hereinafter described. Then, the apparatus information acquisition unit 444 acquires status information transmitted as a response from the recording apparatus 402. In particular, the apparatus information acquisition unit 444 acquires status information including a contract situation of the user with regard to pay channels as limitation information representative of a limitation to channels which can be viewed by the user from each of the dedicated tuner 400 and the general purpose tuner (recording apparatus 402).

If the operation detection unit 44 detects a user operation for designating a recording target program, then the recording apparatus selection unit 446 determines priorities of the individual recording apparatus (namely, the local, recording apparatus 402*a*, and recording apparatus 402*b*). This user operation may be, for example, an operation for depressing a recording reservation button in a state in which a particular program is selected in the second program table. The recording apparatus selection unit 446 determines a recording apparatus which has the highest priority from among the plural recording apparatus as a recommended recording destination to be used for recording of the recording target program.

A determination method of a priority of a recording apparatus is described. The recording apparatus selection unit 446 causes the apparatus information acquisition unit 444 to acquire the latest status information of the recording apparatus and refers to the status information and the apparatus information stored in the apparatus information retaining unit 440 to execute the following steps. It is to be noted that any recording apparatus whose priority becomes equal to or lower than 0 even once in the following steps is not selected as a recommended recording destination.

1) An initial priority allocated to the recording apparatus is acquired.

2) It is confirmed whether or not the recording apparatus can receive a channel of a recording target program. For example, it may be confirmed whether or not a service ID which is identification information of the recording target program is retained in the receivable channel column of the apparatus information. If the channel cannot be received, then the priority is set to 0.

3) When the recording target program is a pay program, it is confirmed whether or not the channel included in the contract. For example, it may be confirmed whether or not the service ID which is identification information of the recording target program is retained in the receivable channel column of the apparatus information. If the channel is not included in the contract, then the priority is set to 0.

4) If the recording target program is broadcasted principally by a channel of a pay broadcast, then the number of channels included in the contract through the B-CAS card is added to the priority.

5) If the recording target program is broadcasted principally by a free broadcast, then the number of channels included in the contract through the B-CAS card is subtracted from the priority.

In 4) and 5) above, the recording apparatus selection unit 446 may refer to EPG data acquired from the dedicated tuner 400, recording apparatus 402*a*, and recording apparatus 402*b* to decide whether the recording target program is broadcasted principally by a pay broadcasting channel although it includes some pay broadcasting programs and whether the recording target is broadcasted principally by a free broadcast channel although it includes some pay broadcasting programs. As an another example, the information processing apparatus 11 may retain in advance channel attribute information determined in advance and representing whether each channel principally is a pay broadcasting channel or principally is a free broadcasting channel. Further, the information processing apparatus 11 may decide in accordance with the information whether the channel of the recording target program provides a free broadcast or a pay broadcast.

6) It is confirmed whether or not broadcasting time of the recording target program overlaps with recording time (broadcasting time) of a different program reserved for recording. If such overlapping is confirmed, then the overlapping percentage is calculated, and if the overlapping percentage is high, then a great amount is subtracted from the priority. Particularly, the calculation is carried out in the following manner.

overlapping percentage=time period within which the recording target program or the different program reserved for recording is not recorded (namely, overlapping time period of recording+broadcasting time period of the recording target program)

priority=priority−overlapping percentage×600

7) The storage size required for recording of the recording target program (such storage size is hereinafter referred to also as "required storage size") is calculated. Although the required storage size sometimes differs between a plurality of different recording modes (picture quality, recording form and so forth), it may be calculated with reference to a standard recording mode.

7-1) If the free space of the storage of the recording apparatus (for example, the recording information retaining unit 432 of the recording apparatus 402) is smaller than the required storage size, then the priority is set to 0.

7-2) Also with regard to a program reserved for recording, a required storage size is determined, and if the free space of the storage of the recording apparatus is smaller than the sum of the required storage size of the recording target program and the required storage size of the program reserved for recording, then 100 is subtracted from the priority. The required storage size of the recording target program may be acquired as status information from the recording apparatus. Alternatively, the EPG data of the program reserved for recording acquired as the status information may be referred to to specify the broadcasting time period of the program to calculate the required storage size.

7-3) If the free space of the storage of the recording apparatus is smaller than five times the required storage size of the recording target program, then one is subtracted from the priority.

Figure 22:
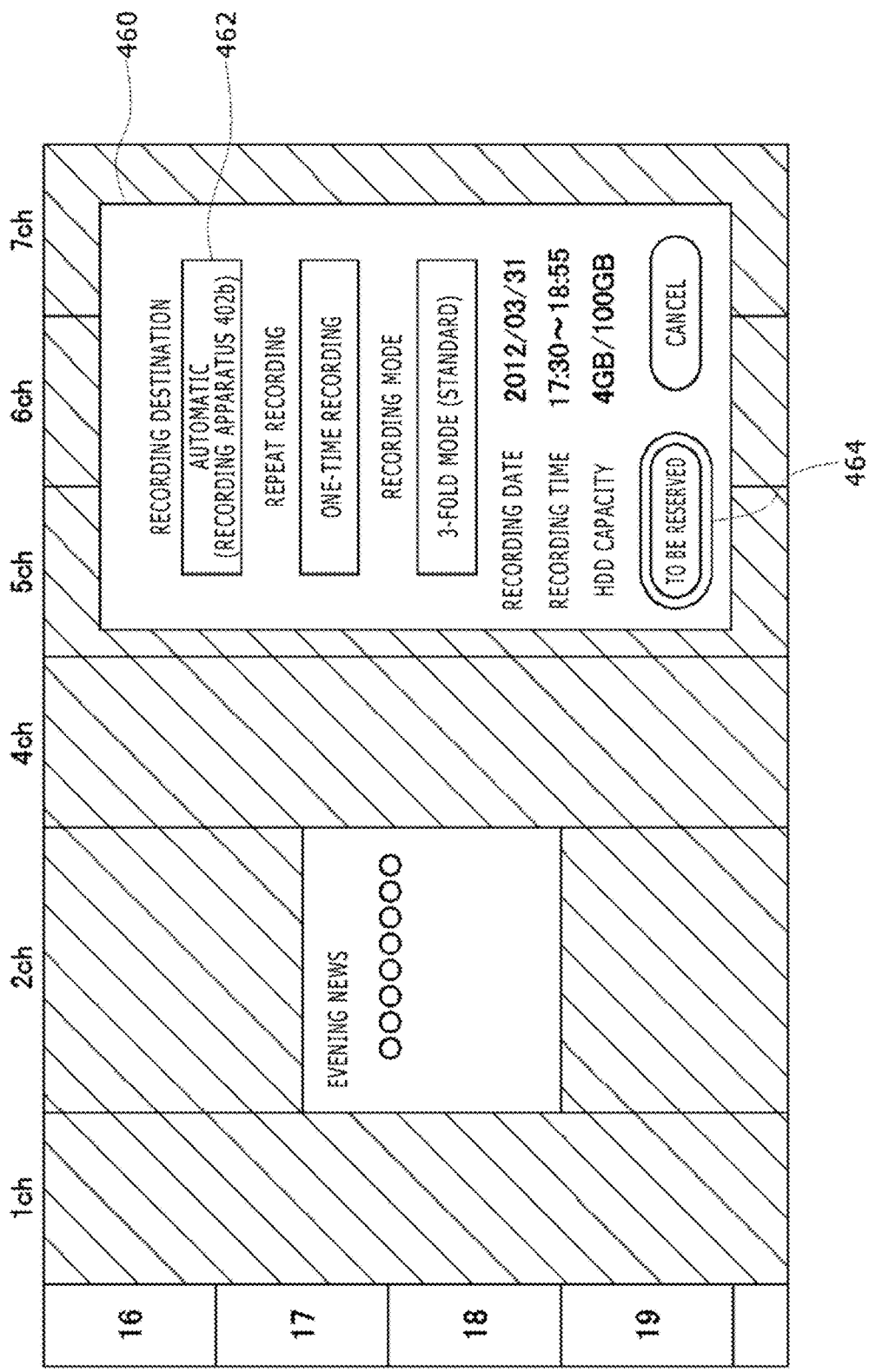
FIG. 22 is a view depicting a recording setting screen image.

When the operation detection unit 44 detects a user operation which designates a recording target program, the recording setting screen image displaying unit 450 causes a recording setting screen image for allowing the user to set a form of recording to be displayed. FIG. 22 depicts the recording setting screen image. FIG. 22 depicts a state in which a recording setting screen image 460 is displayed when a particular program (here, "evening news") is designated as a recording target program in the second program table. If the operation detection unit 44 detects a user operation which designates a recording target program, then the second program table displaying unit 94 causes program information of the programs in the program table other than the recording target program to be displayed in a visibility lowered from that till then similarly as in FIG. 11.

The recording setting screen image 460 includes a recording destination designation field 462 for designating a recording destination of a recording target program. Upon initial display of the recording setting screen image 460, the recording setting screen image displaying unit 450 sets a recommended recording destination selected by the recording apparatus selection unit 446 to the recording destination designation field 462 together with a mark ("automatic" in FIG. 22) representing that the recommended recording destination is selected automatically.

It is to be noted that, if the user selects the recording destination designation field 462, then the recording setting screen image displaying unit 450 causes a pull-down menu indicative of a table of recording apparatus which can be designated as a recording destination, namely, a table of recording apparatus registered by the information processing apparatus 11, to be displayed. The user can select, from within the pull-down menu, a desired recording apparatus, namely, a recording destination other than the recommended recording destination. Further, upon initial display of the recording setting screen image 460, the recording setting screen image displaying unit 450 causes a cursor 464 to be displayed in a state in which the reservation decision button is selected. Consequently, if the recommended recording destination may be maintained, then the user can complete the recording reservation immediately by merely depressing the determination button on the recording setting screen image 460.

Referring back to FIG. 20, if the reservation decision button is depressed on the recording setting screen image 460, then the recording processing unit 64 transmits recording reservation information indicative of a recording target program, a channel, recording time, and a required storage size to a recording apparatus designated as a recording destination by the recording setting screen image 460. For example, if the recording destination is the local storage, then the recording processing unit 64 stores the recording reservation information into the recording information retaining unit 52. On the other hand, if the recording destination is the recording apparatus 402*a*, then the recording processing unit 64 transmits the recording reservation information to the recording apparatus 402a so that the recording reservation information is stored into the reservation information retaining unit 430 of the recording apparatus 402a.

If the operation detection unit 44 detects a user operation which designates a viewing target program from among programs being broadcasted at present, then the tuner selection unit 448 determines a priority ranking of the tuners connected to the information processing apparatus 11 (namely, the dedicated tuner 400, recording apparatus 402a, and recording apparatus 402b). This user operation may be, for example, an operation for designating a particular program in the first program table as a finally selected program. The tuner selection unit 448 determines the tuner which has the highest priority among the plural tuners as a use tuner to be used in viewing of the viewing target program.

A determination method of a priority of a tuner is described. The tuner selection unit 448 causes the apparatus information acquisition unit 444 to acquire the latest status information of the tuners and refers to the status information and the apparatus information stored in the apparatus information retaining unit 440 to execute the following steps. It is to be noted that any tuner whose priority becomes equal to or lower than 0 even once is not selected as a use tuner at the following steps.

1) In the case of the dedicated tuner 400:

1-1) It is confirmed whether or not the dedicated tuner 400 can receive the channel of the viewing target program. For example, it may be confirmed whether or not the service ID which is identification information of the viewing target program is retained in the receivable channel column of the apparatus information. If the channel cannot be received, then the priority is set to 0.

1-2) It is confirmed whether or not the dedicated tuner 400 is being used for a recording process by the recording processing unit 64. For example, it may be confirmed whether or not the present point of time is included in a time zone reserved for recording included in the recording information of the recording information retaining unit 52. If the dedicated tuner 400 is being used for recording and a channel different from the recording target channel is selected by the user, then the priority is set 0. On the other hand, if a channel same as the recording target channel is selected by the user, then the priority is set to 2000 (medium priority).

1-3) If the dedicated tuner 400 can receive the channel of the viewing target program and besides is not being used for recording, then the priority is set to 3000 (high priority).

2) In the case of the recording apparatus 402 (namely, the general purpose tuner of the recording apparatus 402):

2-1) It is confirmed whether or not the recording apparatus 402 can receive the channel of the viewing target program. If the recording apparatus 402 cannot receive the channel, then the priority is set to 0.

2-2) It is confirmed whether or not the recording apparatus 402 is being used for a recording process. For example, it may be confirmed whether or not the present point of time is included in a time zone reserved for recording included in the status information. If the recording apparatus 402 is being used for recording and a channel different from the recording target channel is selected by the user, then the priority is set to 0. On the other hand, if a channel same as the recording target channel is selected by the user, then the priority is set to 2000 (medium priority).

2-3) It is confirmed whether or not the recording apparatus 402 permits a viewing session of a broadcasting program to a new DLNA client in accordance with a session number and session types set already. When a viewing session with the recording apparatus 402 can be established, the priority is set to 3000 (high priority). However, if a viewing session cannot be established, then the priority is set to 2000 (medium priority). In the present embodiment, if one viewing session of a broadcasting program is set already to the DLNA-compatible apparatus 408, then the recording apparatus 402 rejects setting of a new viewing session to the information processing apparatus 11.

2-4) If the viewing target program is a pay program, then it is confirmed whether or not the channel is included in the contract already. If the channel is not included in the contract, then the priority is set to 1000 (low priority).

2-5) The number of channels included in the contract for the recording apparatus 402 is subtracted from the priority.

Accordingly, if the priority of the dedicated tuner 400 calculated by 1) above and the priority of the recording apparatus 402 calculated up to 2-4) above are equal to each other, then the priority of the dedicated tuner 400 is made higher than that of the recording apparatus 402 by the step of 2-5). Further, if the priority of the recording apparatus 402 calculated at the steps up to 2-4 above, then the priority of the recording apparatus 402 having a relatively small number of channels included in the contract (namely, the number of channels which can be viewed by the user) is made higher than the priority of the recording apparatus 402 having a relatively large number of channels included in the contract by the step described above. For example, in the case of the apparatus information illustrated in FIG. 21, if the priority of the dedicated tuner 400 calculated in 1) above and the priorities of the recording apparatus 402a and the recording apparatus 402b calculated at the steps up to 2-4) above are equal to each other, then the priority of the dedicated tuner 400>priority of the recording apparatus 402b>priority of the recording apparatus 402a is established by the step of 2-5).

The program video acquisition unit 58 transmits a channel selection instruction indicative of a channel selected by the user to the use tuner determined by the tuner selection unit 448 (namely, one of the dedicated tuner 400, recording apparatus 402a, and recording apparatus 402b). For example, if the use tuner is the recording apparatus 402a, then the program video acquisition unit 58 transmits an HTTP request indicative of the channel selection instruction to the recording apparatus 402a through the communication processing unit 42.

The recording apparatus 402a accepting the channel selection instruction AES encrypts the selected channel data including a video and an audio of the channel designated by the user and stream distributes the resulting selected channel data to the information processing apparatus 11. When the program video acquisition unit 58 acquires the selected channel data from the use tuner, it AES decodes the data. The program video displaying unit 84 passes the data of the program and audio of the channel which are a result of the decoding to the display unit 14 so as to be outputted.

A behavior of the information processing apparatus 11 having the configuration described above is described below.

Figure 23:
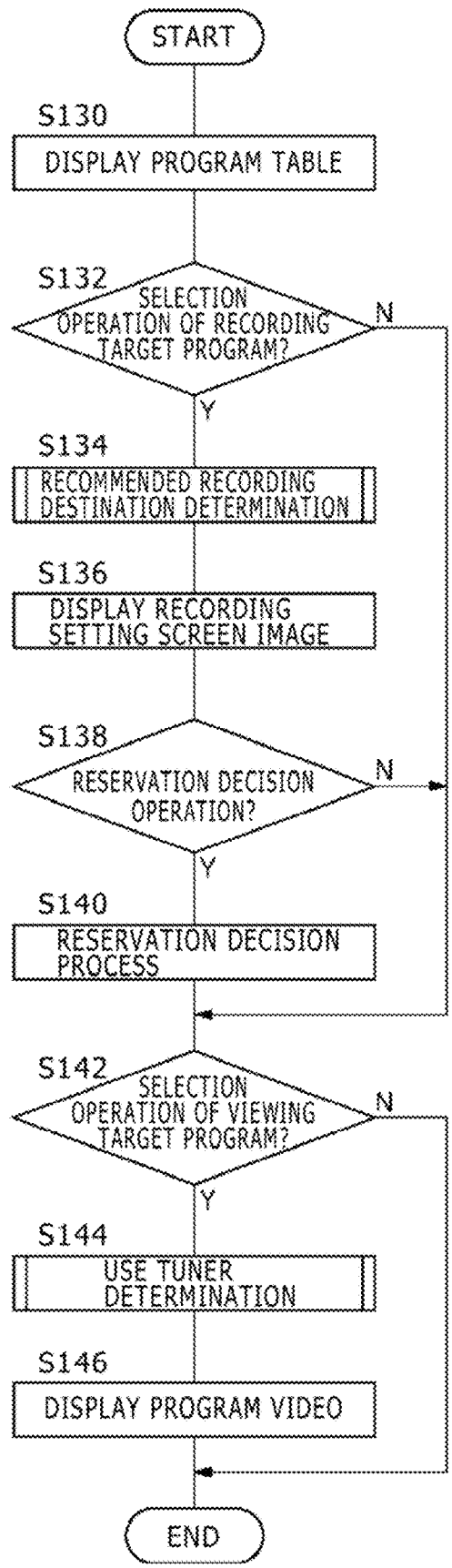
FIG. 23 is a flow chart illustrating a behavior of the information processing apparatus.

FIG. 23 is a flow chart illustrating a behavior of the information processing apparatus 11. FIG. 23 illustrates a selection behavior of a recording apparatus and a selection behavior of a tuner. Though not depicted in FIG. 23, the apparatus registration unit 442 executes a registration process of the dedicated tuner 400 and the recording apparatus 402 connected to the information processing apparatus 11, and upon registration of the dedicated tuner 400 and the recording apparatus 402, the apparatus information acquisition unit 444 acquires information of the apparatus and stores the information into the apparatus information retaining unit 440.

If, while the first program table or the second program table is being displayed (S130), a user operation for designating a recording target program is detected (Y at S132), then the recording apparatus selection unit 446 determines a recommended recording destination from among a plurality of recording apparatus (S134). The recording setting screen image displaying unit 450 causes the recording setting screen image 460, in which the recommended recording destination is set as a default recording destination, to be displayed (S136). If a reservation decision operation is carried out on the recording setting screen image 460 (Y at S138), then the recording processing unit 64 executes a recording reservation process (S140). If a reservation decision operation is not executed on the recording setting screen image 460 (N at S138), then the step S140 is skipped, but if a user operation for designating a recording target program is not detected (N at S132), then the steps S134 to S140 are skipped.

If a user operation for designating a viewing target program is detected (Y at S142), then the tuner selection unit 448 determines a use tuner from among the plural tuners (S144). The program video acquisition unit 58 transmits a channel selection instruction to the use tuner and acquires selected channel data outputted from the use tuner, and the program video displaying unit 84 outputs a video and an audio of the channel selected by the user to the display unit (S146). If a user operation for designating a viewing target program is not detected (N at S142), then the steps S144 and S146 are skipped and the flow of FIG. 23 is ended.

Figure 24A:
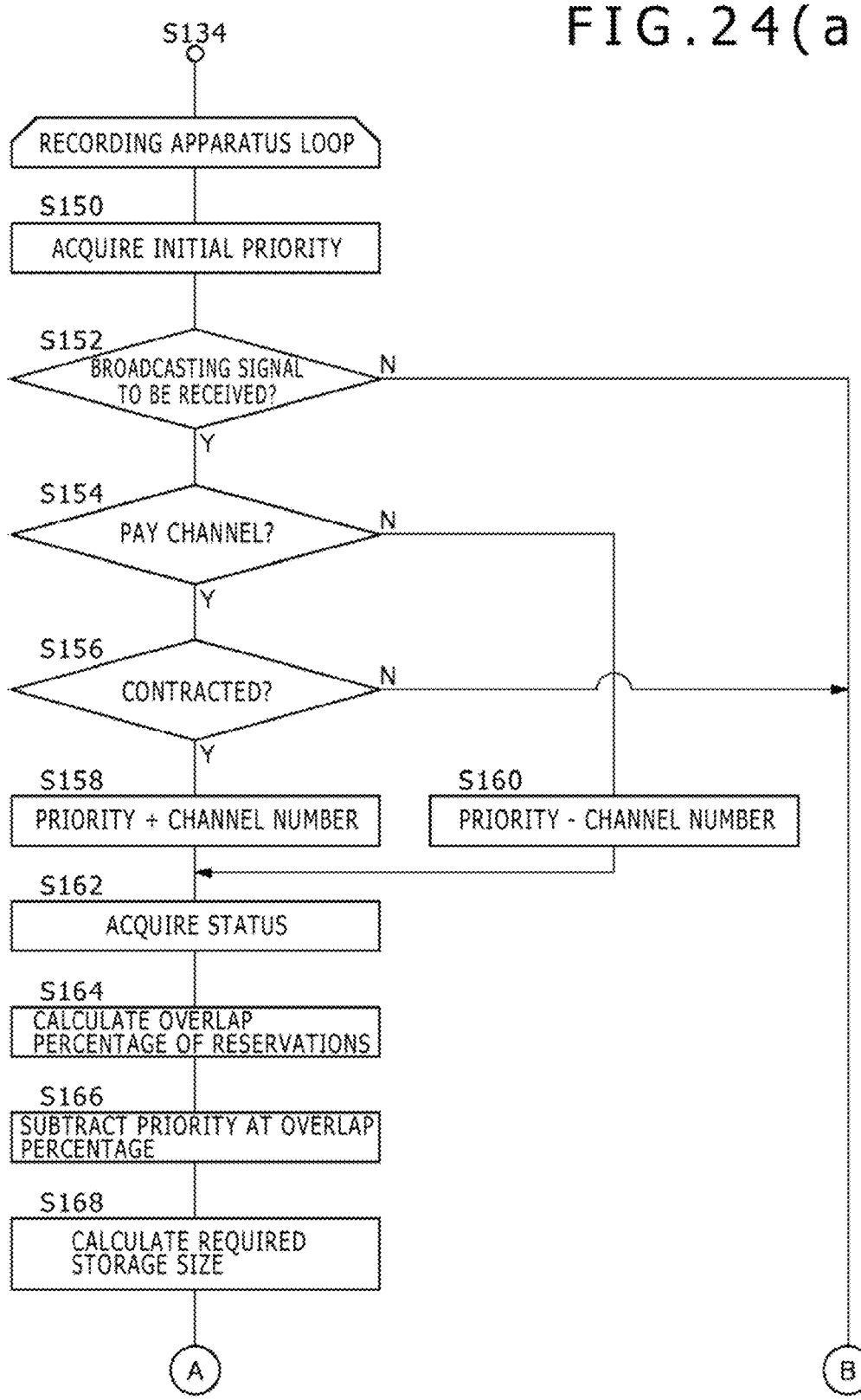
FIG. 24($a$) is a flow chart illustrating S134 of FIG. 23 in detail.
FIG. 24(b) is a flow chart illustrating S134 of FIG. 23 in detail.
Figure 24B:
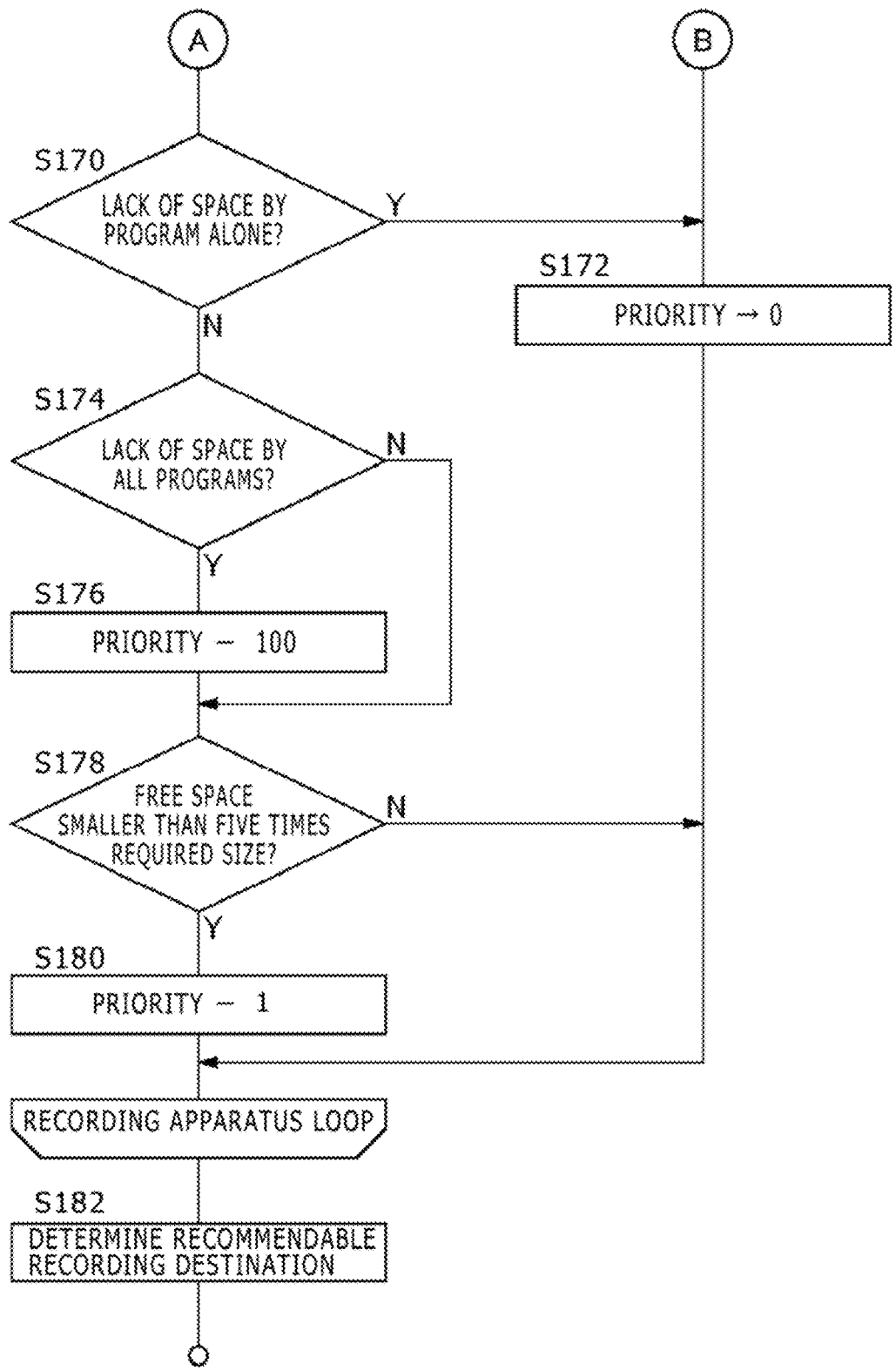

FIG. 24(a) and FIG. 24(b) are flow charts illustrating the recommended recording designation determination process at step S134 of FIG. 23 in detail. FIG. 24(b) illustrates a behavior following FIG. 24(a). In the recommended recording destination determination process, the following steps S150 to S180 are repeated as a recording apparatus loop for each recording apparatus to determine the priority of each recording apparatus.

In particular, the recording apparatus selection unit 446 refers to the apparatus information to acquire the initial priority of the recording apparatus of the priority calculation target (S150). Then, if a signal of the channel through which the recording target program is broadcasted can be received (Y at S152) and the channel is a pay channel (Y at S154), then if the user has a viewing contract for the channel (Y at S156), then the channel number contacted for viewing in the recording apparatus of the priority calculation target is added to the priority (S158). If the channel through which the recording target program is broadcasted is a free channel (N at S154), then the channel number included in the contract for viewing for the recording apparatus of the priority calculation target is subtracted from the priority (S160).

The apparatus information acquisition unit 444 acquires status information from the recording apparatus of the priority calculation target (S162). If the recording apparatus of the priority calculation target is the local, then status information may be acquired, for example, from the recording processing unit 64 or the recording information retaining unit 52. The recording apparatus selection unit 446 refers to the status information acquired by the apparatus information acquisition unit 444 to calculate an overlapping percentage between the recording time of the program reserved for recording and the recording time of the recording target program (S164), and carries out subtraction of the priority in response to the overlapping percentage (S166). Further, the recording apparatus selection unit 446 calculates a required storage space for recording of the recording target program (S168).

If, although the free space of the storage of the recording apparatus is equal to or greater than the space required for recording of the recording target program itself (N at S170), it is smaller than the space of the sum of spaces required for recording of programs reserved for recording (Y at S174), then 100 is subtracted from the priority (S176). On the other hand, if the free space of the storage of the recording apparatus is smaller than five times the space required for recording of the recording target program (Y at S178), then one is subtracted from the priority (S180). If the free space of the storage of the recording apparatus is equal to or greater than the sum of the space required for recording of the recording target program itself and the space required for recording of a program or programs reserved for recording (N at S174), then the step S176 is skipped, and if the free space of the storage of the recording apparatus is equal to or greater than five times the space required for recording of the recording target program (N at S178), then the step S180 is skipped.

Further, if a signal of the channel through which the recording target program is broadcasted cannot be received (N at S152), the recording target program is broadcasted by a pay channel. Additionally, if the channel is not contracted (N at S156), or if the free space of the storage of the recording apparatus is smaller than the space required for recording of the recording target program itself (Y at S170), then the priority is set to 0 (S172). After the recording apparatus loop comes to an end, the recording apparatus selection unit 446 determines the recording apparatus having the highest priority as a recommended recording destination (S182).

Figure 25A:
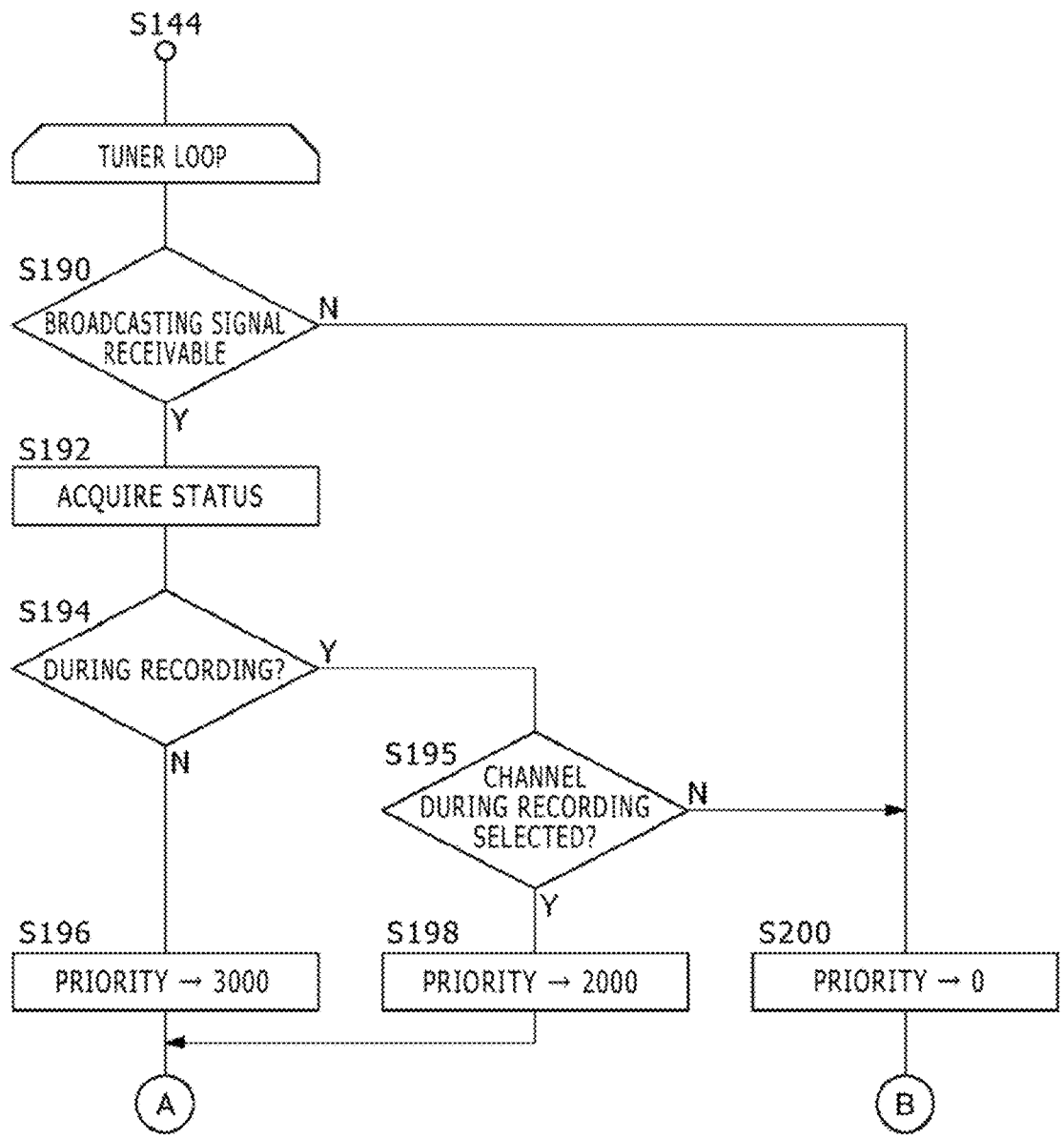
FIG. 25(a) is a flow chart illustrating S144 of FIG. 23 in detail.
Figure 25B:
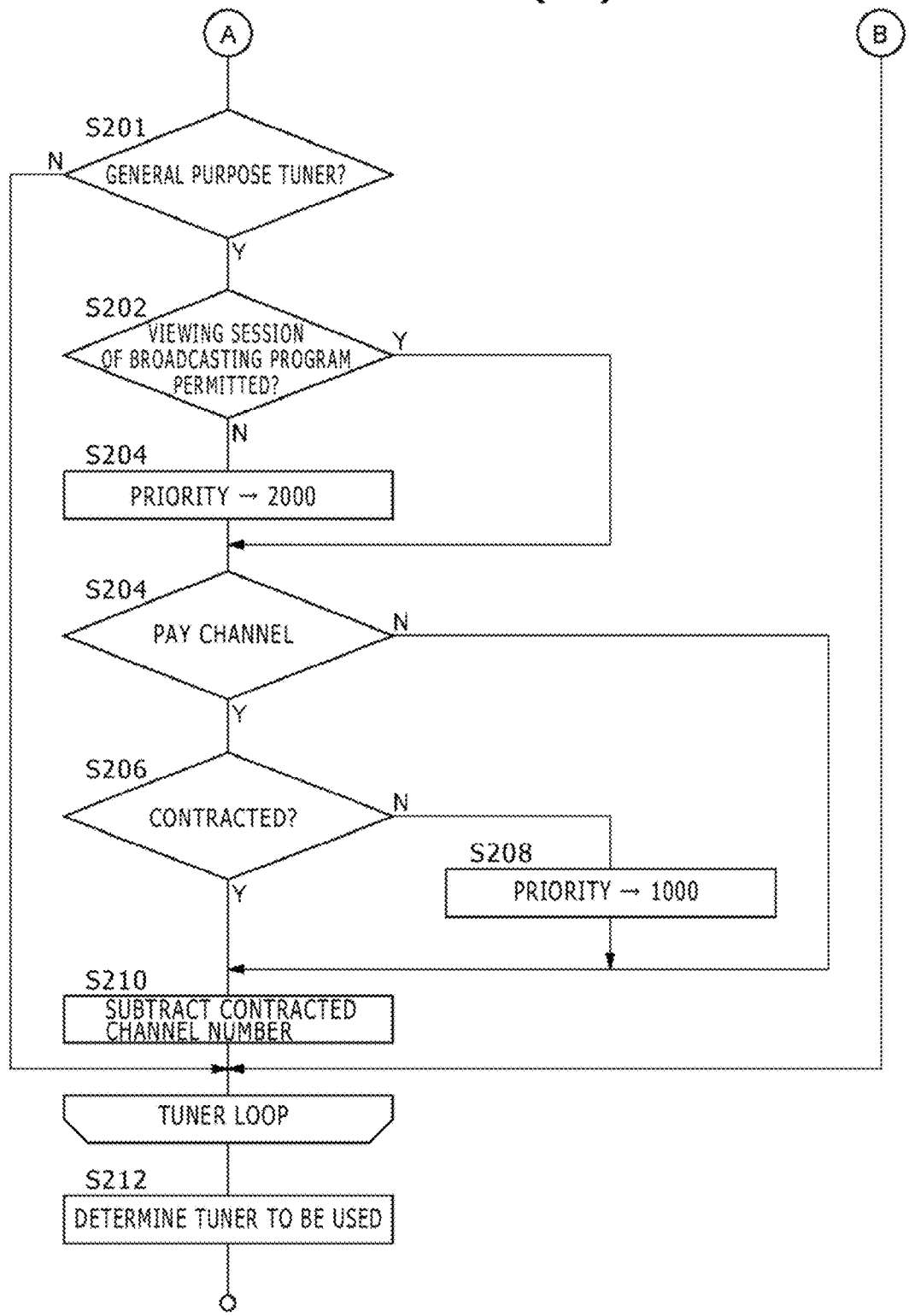
FIG. 25(b) is a flow chart illustrating S144 of FIG. 23 in detail.

FIG. 25(a) and FIG. 25(b) are flow charts particularly illustrating the use tuner determination process at S144 of FIG. 23. FIG. 25(b) illustrates a behavior following FIG. 25(a). In the use tuner determination process, the following steps S190 to S210 are repeated for each tuner as a tuner loop to determine the priority of each tuner.

In particular, the tuner selection unit 448 refers to the apparatus information to determine whether or not a signal of a channel through which the viewing target program is broadcasted can be received. If a signal of the channel cannot be received (N at S190), then the priority is set to 0 (S200). When the priority is set to 0, since the tuner is no more selected as a use tuner, the priority determination process for the tuner is ended. If a signal of the channel can be received (Y at S190), then the apparatus information acquisition unit 444 acquires status information from the tuner of the priority calculation target (dedicated tuner 400, recording apparatus 402a or recording apparatus 402b) (S192).

If the tuner of the priority calculation target is being used in program recording (Y at S194), then if the channel of the viewing target program and the channel being recorded coincide with each other (Y at S195), then the priority is set to 2000 (S198). On the other hand, if the channel of the viewing target program and the channel being recorded do not coincide with each other (N at S195), then the priority is set to 0 (S200). Meanwhile, if the tuner of the priority calculation target is not being used in program recording (N at S194), then the priority is set to 3000 (S196).

If the tuner of the priority calculation target is the general purpose tuner of the recording apparatus 402 (Y at S201), then the following steps are executed further. If the general purpose tuner does not permit new setting of a viewing session of a broadcasting program (N at S202), then the priority is set to 2000 (S203), but if the general purpose tuner permits new setting of a viewing session of a broadcasting program (Y at S202), then the step S203 is skipped. If the viewing target program is broadcasted through a pay channel (Y at S204) and the pay channel is included in the contract for viewing by the user (Y at S206), then the channel number included in the contract for viewing for the recording apparatus 402 is subtracted from the priority (S210). If the pay channel is not included in the contract by the user as yet (N at S206), then the priority is set to 1000 and the step S210 is executed. If the channel of the viewing target program is a free channel (N at S204), then the steps S206 and S208 are skipped and the step S210 is executed.

If the tuner of the priority calculation target is the dedicated tuner 400 (N at S201), then the steps S204 to S210 are skipped. When the tuner loop comes to an end, the tuner selection unit 448 determines the tuner having the highest priority as a use tuner (S212).

With the information processing apparatus 11 of the embodiment, from among a recording apparatus built in the present embodiment and at least one external recording apparatus connected through a communication network, a recording apparatus suitable for use in program recording is selected autonomously and can be presented as a recommended recording destination to the user. Consequently, the burden on the user upon recording reservation can be reduced.

In particular, when the recording target program is broadcasted by a free channel, a higher priority is set to a recording apparatus which uses a tuner having a smaller number of channels which can be viewed by a user. As described hereinabove, each of the dedicated tuner 400 and the recording apparatus 402 is a single tuner and does not allow, during recording, viewing of a channel other than the channel of the recording target. Accordingly, if a recording apparatus which uses a tuner having a comparatively small number of channels which can be viewed is determined preferentially as a recording destination, then even if the tuner is occupied by recording, by using a tuner of a recording apparatus having a greater number of viewable channels, the user is facilitated to carry out viewing or recording of an arbitrary channel.

It is to be noted that, when the recording target program is broadcasted through a pay channel, a higher priority is set to a recording apparatus which uses a tuner having a greater number of channels which can be viewed by the user. This is because channels which can be viewed on one recording apparatus are fully included in channels which can be viewed on the other recording apparatus and it is considered that, in a recording apparatus having a smaller number of channels which can be viewed, channels on which an interest or an intention of a user are reflected better are selected. Consequently, even if one tuner is occupied by recording, by using a tuner of a recording apparatus having a smaller number of channels which can be viewed, the user is facilitated to carry out viewing or recording of a channel on which a taste or an intention of the user itself is reflected better.

Further, a higher priority is set to a recording apparatus having a lower ratio at which the broadcasting time zone of a recording target program overlaps with the time zone reserved for recording. Consequently, it becomes more likely to avoid a situation that at least some of a recording target program and programs reserved for recording cannot be recorded, and also in a case in which such avoidance cannot be carried out fully, the time period within which recording overlaps can be reduced readily.

Further, if a recording apparatus wherein the free space of the storage is smaller than the storage space required for recording of the program or programs reserved for recording and recording of the recording target program is available, then the priority for the recording apparatus is set low. Consequently, it becomes more likely to avoid a situation that at least some of a recording target program and programs reserved for recording is not recorded.

Further, with the information processing apparatus 11, a tuner suitable for use in program viewing can be selected autonomously from among a dedicated tuner directly connected to the present apparatus and at least one general purpose tuner connected to the present apparatus through a communication network. Consequently, the burden on the user when a program being broadcasted is viewed can be reduced.

In particular, when the viewing target channels can be viewed through both of a general purpose tuner and a dedicated tuner, the priority for the dedicated tuner is set higher. Since the access speed to the dedicated tuner is higher than the access speed to the general purpose tuner, by using the dedicated tuner preferentially, the period of time until a video is displayed after the channel selection by the user can be reduced to enhance the convenience in program viewing. For example, if, during viewing of a first channel, the live index value of a second channel displayed on the first program table increases and consequently changeover to the second channel is carried out, then a video of the second channel is displayed in a short period of time. Consequently, it becomes more likely to provide the program video which has become a cause of increasing the live index value to the user.

Further, where a plurality of general purpose tuners are available, a comparatively high priority is set to a general purpose tuner which has a comparatively small number of channels which can be viewed. As described hereinabove, any of the plural recording apparatus 402 is a single tuner, and during viewing of a program of a certain channel, viewing of any other channel cannot be carried out. Accordingly, by preferentially selecting a tuner having a comparatively small number of channels which can be viewed, even if the tuner is occupied by program viewing of the information processing apparatus 11 by the user, the user of the DLNA-compatible apparatus 408 is facilitated to carry out viewing of an arbitrary channel by using a tuner having a comparatively great number of channels which can be viewed.

Further, even if the dedicated tuner is being used for recording, if the recording target channel and the viewing target channel are same, then the viewing target channel can be viewed also by the dedicated tuner. However, in the present embodiment, when the dedicated tuner is being used for recording, even if the viewing target channel can be viewed by both of the general purpose tuner and the dedicated tuner, the priority for the general purpose tuner can be set higher. The user may change over the channel of the viewing target, and if the dedicated tuner is selected in the case described above, then changeover between the tuners occurs frequently because the viewing of the other channel need to use the general purpose tuner. As a result, a collision with other users (user of the DLNA-compatible apparatus 408 and so forth) becomes more likely to occur, and also the adjustment process therefor is complicated. With the form of the present embodiment, it becomes more likely to reduce, upon channel changeover, the frequency by which changeover between tuners occurs and continue viewing by the same tuner.

Further, the general purpose tuner acquires a session number set already and reflects it upon the priority whether or not the general purpose tuner can set a new session. Consequently, a general purpose tuner suitable for viewing of a program can be selected automatically without causing the user to be conscious of the session number of the general purpose tuner.

The present invention is described above based on the embodiment. The present embodiment is illustrative, and it is recognized by those skilled in the art that various modifications are possible to a combination of the components and the processing procedures of the embodiment and that also such modifications are included in the scope of the present invention. Modifications are described below.

In the embodiment described above, a recommended recording destination determined by the recording apparatus selection unit 446 is displayed on the recording setting screen image 460, and the user can change the recording destination to an arbitrary recording destination on the recording setting screen image 460. In a modification, the recording processing unit 64 may transmit recording reservation information to the recording apparatus of the recommended recording destination without displaying the recording setting screen image 460, or in other words, without allowing the user to change the recommended recording destination determined by the recording apparatus selection unit 446.

Further, in the embodiment described hereinabove, when a recording target program is broadcasted through a pay channel, a comparatively high priority is set to a recording apparatus which uses a comparatively great number of channels which can be viewed by the user. As a modification, when a recording target program is broadcasted through a pay channel, a comparatively high priority may be set to a recording apparatus which uses a tuner having a comparatively small number of channels which can be viewed by the user from among recording apparatus which use tuners which have a contract with regard to the pay channel. With the present modification, if a recording apparatus which uses a tuner having a comparatively small number of channels which can be viewed is determined preferentially as a recording destination, then even if the tuner is occupied by recording, by using a tuner of a recording apparatus having a smaller number of viewable channels, the user is facilitated to carry out viewing or recording of an arbitrary channel similarly as in the case in which a recording target program is broadcasted through a free channel.

Further, though not mentioned in the foregoing description of the embodiment, the recording list displaying unit 98 may acquire information of recorded contents and/or recording reservations retained in the local recording information retaining unit 52 and may acquire information of recorded contents and/or recording reservations retained in the recording apparatus 402a and the recording apparatus 402b. Further, the information of the recorded contents and/or the recording reservations may be displayed in a descending order or an ascending order of the recording date and time in the same recording list 150 irrespective of whether the recorded contents are retained in the local storage or the external recording apparatus 402 and irrespective of whether the recording reservation destination is the external recording apparatus 402. By the configuration of the embodiment described above, the necessity for the user to be conscious of the recording destination upon recording reservation is eliminated. In addition, by the configuration of the present modification, also upon confirmation of a recording situation or upon playback of a recorded content, the user can carry out viewing and so forth of the recoded content without being conscious of the recording reservation destination or the retaining main constituent of the recorded content.

Also an arbitrary combination of the base technology, embodiment, and modifications described above is useful as an embodiment of the present invention. A new embodiment created by the combination has effects which the embodiment and the modifications combined with each other individually have.

Also it is recognized by those skilled in the art that the functions which are to be realized by the features described in the claims are implemented by each or cooperation of the components exemplified in the base technology, embodiment, and modifications.

REFERENCE SIGNS LIST

10 Program viewing system, 11 Information processing apparatus, 42 Communication processing unit, 58 Program video acquisition unit, 60 Program information acquisition unit, 64 Recording processing unit, 66 Playback processing unit, 84 Program video displaying unit, 100 Information processing system, 440 Apparatus information retaining unit, 442 Apparatus registration unit, 444 Apparatus information acquisition unit, 446 Recording apparatus selection unit, 448 Tuner selection unit, 450 Recording setting screen image displaying unit, 452 Dedicated tuner IF unit.

INDUSTRIAL APPLICABILITY

The present invention can be applied to an apparatus which supports viewing or recording of a program.

The invention claimed is:

1. An information processing apparatus, comprising:
   a first interface connected to a general purpose tuner through a communication network;
   a second interface directly connected to a dedicated tuner;
   a tuner information acquisition unit which acquires information of channels which can be individually viewed through the general purpose tuner and the dedicated tuner as tuner information,
   wherein a set of channels viewed through the general purpose tuner are different than a set of channels viewed through the dedicated tuner;
   an acceptance unit which accepts a user operation for designating a viewing target channel; and
   a selection unit which determines, when the user operation is accepted, a priority of each of the general purpose tuner and the dedicated tuner in response to the tuner information and selects that one of the tuners which has a comparatively high priority as a tuner to be used for viewing of the viewing target channel;
   the selection unit setting a comparatively high priority to the dedicated tuner when the viewing target channel can be viewed through both of the general purpose tuner and the dedicated tuner.

2. The information processing apparatus according to claim 1, wherein the first interface is connected to a plurality of general purpose tuners through the communication network, the tuner information acquisition unit acquires information representative of channels which can be viewed by each of the plural general purpose tuners, and the selection unit sets, as the priority for each of the plural general purpose tuners, a comparatively high priority to that one of the general purpose tuners which has a comparatively small number of channels which can be viewed by the general purpose tuner.

3. The information processing apparatus according to claim 1, wherein the tuner information acquisition unit further acquires information representative of whether or not the dedicated tuner is being used for recording, and when the dedicated tuner is being used for recording and the recording target channel of the dedicated tuner and the viewing target channel are the same, even if the viewing target channel can be viewed through both of the general purpose tuners and the dedicated tuner, the selection unit sets a comparatively high priority to the general purpose tuner.

4. The information processing apparatus according to claim 1, wherein the first interface is connected to a plurality of general purpose tuners through the communication network, each of the plural general purpose tuners permits a number of sessions with a client which receives a channel video, the number being equal to or smaller than a predetermined number given as an upper limit, the tuner information acquisition unit further acquires a session number set already by each of the plural general purpose tuners, and the selection unit sets, in response to the session number set already by each of the general purpose tuners, the priority such that the priority for the general purpose tuner which permits a session with the information processing apparatus is higher than the priority for the general purpose tuner which does not permit a session with the information processing apparatus.

5. A tuner selection method executed by an information processing apparatus which is connected to a general purpose tuner through a communication network and connected directly to a dedicated tuner, the tuner selection method comprising:

a step of acquiring information representative of channels which can be individually viewed through the general purpose tuner and the dedicated tuner individually as tuner information, wherein a set of channels viewed through the general purpose tuner are different than a set of channels viewed through the dedicated tuner;

a step of accepting a user operation for designating a viewing target channel; and a step of determining, when the user operation is accepted, a priority of each of the general purpose tuner and the dedicated tuner in response to the tuner information and selecting that one of the tuners which has a comparatively high priority as a tuner to be used for viewing of the viewing target channel, the step of selecting setting a comparatively high priority to the dedicated tuner when the viewing target channel can be viewed through both of the general purpose tuner and the dedicated tuner.

6. A non-transitory computer readable storage medium having stored thereon a computer program for causing an information processing apparatus, which is connected to a general purpose tuner through a communication network and connected directly to a dedicated tuner, to implement:

a function for acquiring information representative of channels which can be individually viewed through the general purpose tuner and the dedicated tuner individually as tuner information;

a function for accepting a user operation for designating a viewing target channel; and a function for determining, when the user operation is accepted, a priority of each of the general purpose tuner and the dedicated tuner in response to the tuner information and selecting that one of the tuners which has a comparatively high priority as a tuner to be used for viewing of the viewing target channel, the function for selecting setting a comparatively high priority to the dedicated tuner when the viewing target channel can be viewed through both of the general purpose tuner and the dedicated tuner.

7. An information processing apparatus, comprising:

an apparatus information acquisition unit which acquires information representative of a limitation relating to viewing or recording of a broadcasting program with regard to each of a plurality of recording apparatus;

an acceptance unit which accepts a user operation for designating a recording target program; and a selection unit which determines, when the user operation is accepted, a priority of each of the recording apparatus in response to the limitation relating to viewing or recording of a broadcasting program by each of the recording apparatus and selects that one of the recording apparatus which has the highest priority as a recording apparatus which is to record the recording target program, wherein the plural recording apparatus individually acquire a video of a broadcasting program using tuners different from each other, the apparatus information acquisition unit acquires information representative of channels through which a video can be acquired by the tuners individually of the plural recording apparatus, and the selection unit sets a comparatively high priority to that one of the recording apparatus which uses that one of the tuners which has a comparatively small number of channels through which a video can be acquired.

8. The information processing apparatus according to claim 7, wherein the apparatus information acquisition unit acquires a situation of recording reservations and a free space of a storage of each of the plural recording apparatus, and the selection unit sets, if the storage of a certain recording apparatus has a free space smaller than a storage space required for recording of a program or programs reserved for recording and recording of the recording target program, a comparatively low priority to the certain recording apparatus.

9. The information processing apparatus according to claim 7, wherein at least one of the plural recording apparatus includes a tuner and a storage and besides is connected to the information processing apparatus through a communication network.

10. A recording apparatus selection method executed by an information processing apparatus, comprising:

a step of acquiring information representative of a limitation relating to viewing or recording of a broadcasting program with regard to each of a plurality of recording apparatus;

a step of accepting a user operation for designating a recording target program; and a step of determining, when the user operation is accepted, a priority of each of the recording apparatus in response to the limitation relating to viewing or recording of a broadcasting program by each of the recording apparatus and selecting that one of the recording apparatus which has the highest priority as a recording apparatus which is to record the recording target program, wherein the plural recording apparatus individually acquire a video of a broadcasting program using tuners different from each other, the step of acquiring information further acquires information representative of channels through which a video can be acquired by the tuners individually of the plural recording apparatus, and the step of determining further sets a comparatively high priority to that one of the recording apparatus which uses that one of the tuners which has a comparatively small number of channels through which a video can be acquired.

11. A non-transitory computer readable storage medium having stored thereon a computer program for causing an information processing apparatus to implement:

a function for acquiring information representative of a limitation relating to viewing or recording of a broadcasting program with regard to each of a plurality of recording apparatus;

a function for accepting a user operation for designating a recording target program; and a function for determining, when the user operation is accepted, a priority of each of the recording apparatus in response to the limitation relating to viewing or recording of a broadcasting program by each of the recording apparatus and selecting that one of the recording apparatus which has the highest priority as a recording apparatus which is to record the recording target program, wherein the plural recording apparatus individually acquire a video of a broadcasting program using tuners different from each other, the function for acquiring information further acquires information representative of channels through which a video can be acquired by tuners individually of the plural recording apparatus, and the function for determining further sets a comparatively high priority to that one of the recording apparatus which uses that one of the tuners which has a comparatively small number of channels through which a video can be acquired.

* * * * *